US012537274B2

(12) United States Patent
Haines et al.

(10) Patent No.: US 12,537,274 B2
(45) Date of Patent: Jan. 27, 2026

(54) TRACK TRANSITION SYSTEMS FOR WAVEGUIDE ASSEMBLIES AND RELATED METHODS

(71) Applicant: The Boeing Company, Arlington, VA (US)

(72) Inventors: Neil E. Haines, Renton, WA (US); Aaron M. Imlah, Seattle, WA (US); Stephen Moore, Maple Valley, WA (US)

(73) Assignee: The Boeing Company, Arlington, VA (US)

( * ) Notice: Subject to any disclaimer, the term of this patent is extended or adjusted under 35 U.S.C. 154(b) by 167 days.

(21) Appl. No.: 18/626,990

(22) Filed: Apr. 4, 2024

(65) Prior Publication Data

US 2025/0316873 A1 Oct. 9, 2025

(51) Int. Cl.
*H01P 1/00* (2006.01)

(52) U.S. Cl.
CPC .................................... *H01P 1/00* (2013.01)

(58) Field of Classification Search
None
See application file for complete search history.

(56) References Cited

U.S. PATENT DOCUMENTS 7,893,789 B2 * 2/2011 Paynter .................. H01P 5/082
333/248

* cited by examiner

*Primary Examiner* — Crystal L Hammond
(74) *Attorney, Agent, or Firm* — Kolitch Romano Dascenzo Gates LLP

(57) ABSTRACT

A transition system for a waveguide assembly may include first and second track transition elements engaged with the waveguide assembly, and positioned on either side of a track gap between first and second track segments of the wave-guide assembly. Trolley slide plates may be fixed to a mobile trolley of the waveguide assembly. As the trolley is moved onto and across the first track transition element, it receives and guide the trolley slide plates from the first track segment as the slide plates are moved across a transition gap to the second track transition element. The second track transition element may receive the trolley slide plates from the first track transition element, and align the trolley slide plates with the second track segment of the waveguide assembly to transfer the trolley to the second track segment and align the trolley antenna with the antenna slot of the second track segment.

20 Claims, 12 Drawing Sheets

TRACK TRANSITION SYSTEMS FOR WAVEGUIDE ASSEMBLIES AND RELATED METHODS

FIELD

The present disclosure relates generally to track transition systems for waveguide assemblies, and more particularly to systems for aligning an antenna across a gap in the assembly.

BACKGROUND

The construction of aircraft or other large structures is often performed within a large building (or side-by-side buildings) using overhead cranes. The cranes often rely on wireless communications to communicate and coordinate the building efforts. To facilitate wireless data transmission for control of the crane, slotted microwave guide (SMG) assemblies having a gutter sized for the frequency of a wireless signal (e.g., a hollow conductor) are used. The specially designed gutter operates to keep the wireless signal isolated within the gutter and free from outside interference. The wireless signal can thus travel from a stationary transceiver and through the gutter while mobile transceivers (e.g., crane antenna trolleys) travel along the SMG assembly to transmit the wireless signal from the gutter to the cranes via the antenna trolley. An antenna extends from the trolley and travels within a slot, or channel, in the SMG assembly. The cranes thus can be moved throughout the building via the wireless signals from the SMG, moving on bridges, and from bridge to bridge.

Because of the scale of the aircraft or other structures being built, SMG assemblies are often installed on structures that are moveable within the construction buildings, thereby allowing the cranes and other equipment access to different regions of the aircraft. To ensure that the cranes have adequate wireless signals, the antenna trolley must move from track to track of the SMG assembly. However, because the tracks of the SMG assembly are moveable, there is usually a gap maintained between the ends of adjacent tracks of the SMG assembly to protect the SMG assembly and the bridges during use. The antenna trolley therefore must traverse terminal track segments as the crane to which it is communicating with transitions from bridge to bridge. If the track segments of the SMG assembly are offset and/or misaligned, the antenna can become misaligned if the gap between adjacent track segments is not navigated properly. In the event of an unreliable transfer across a gap (e.g., if the antenna is misaligned and does not engage with the respective antenna slot on the other side of the gap), then wireless signal will be lost, requiring a shutdown of the crane, a physical reset of the antenna, and potentially a restart of the system.

Existing solutions for bridging such gaps consist of a large funnel formed of two parallel elongate plates with flared edges, but these existing solutions are inadequate. Specifically, the existing solutions are too large and have a very narrow channel that the antenna trolley has to move through. With the amount of antenna trolley movement allowed and the narrowness of the channel, the existing solutions become unreliable. Furthermore, the existing solutions disadvantageously allow the antenna trolley to move up and down (perpendicular to the track) as they pass through, thereby creating a risk of trolley misalignment. There thus remains a need for an improved transition system for such SMG assemblies.

SUMMARY

Presently disclosed transition systems may be configured to address the shortcomings of the prior art solutions discussed above and allow for smooth transitions from bridge to bridge without losing communication due to trolley misalignment. Such systems may be configured to assist in aligning an antenna of a trolley with a track channel, when a crane cab to which the trolley is attached travels between crane bridges. A pair of slide plates mounted to the trolley travel along transition sections between terminal ends of trolley track segments. The transition sections may be shaped to receive the slide plates by means of tapered guide regions that cooperate with the slide plates to align the antenna of the trolley with the track channel and wheels of the trolley with the track as the trolley traverses the gap—even if transition sections are gapped and/or offset.

In an example, a transition system for a waveguide assembly includes a first track transition element and a second track transition element. The first track transition element may be configured to engage with the waveguide assembly and is positioned on a first side of a track gap between a first track segment and a second track segment of the waveguide assembly. The second track transition element may be configured to engage with the waveguide assembly and is positioned on a second side of the track gap between the first track segment and the second track segment of the waveguide assembly. The first track transition element may be positioned with respect to the second track transition element such that a transition gap extends between a gap end of the first track transition element and a gap end of the second track transition element. A first trolley slide plate may be configured to be fixed to a first surface of a trolley of the waveguide assembly, with the trolley being mobile with respect to the first track transition element, the second track transition element, and the waveguide assembly. A second trolley slide plate may be configured to be fixed to a second surface of the trolley of the waveguide assembly, with the first track transition element being configured to receive the first trolley slide plate and the second trolley slide plate from the first track segment of the waveguide assembly as the trolley is moved onto and across the first track transition element. The first track transition element may be configured to guide the first trolley slide plate and the second trolley slide plate as the first trolley slide plate and the second trolley slide plate are moved across the transition gap to the second track transition element. Similarly, the second track transition element may be configured to receive the first trolley slide plate and the second trolley slide plate from the first track transition element, with the second track transition element being configured to align the first trolley slide plate and the second trolley slide plate with the second track segment of the waveguide assembly to transfer the first trolley slide plate and the second trolley slide plate to the second track segment of the waveguide assembly.

In an example, a system may include a waveguide assembly and a transition system. The waveguide assembly may include a first track segment having a first hollow channel for conducting a wireless signal, and a first antenna slot through which an antenna of a trolley extends when the trolley is engaged with the first track segment. The waveguide assembly also may include a second track segment having a second hollow channel for conducting the wireless signal, and a second antenna slot through which the antenna of the trolley extends when the trolley is engaged with the second track segment. A distal end of the first track segment may be spaced apart from a proximal end of the second track segment by a track gap. The waveguide assembly also may include the trolley, with the trolley being selectively movable along the first track segment and the second track segment to provide wireless communication for a workspace from the wireless signal. The transition system may be configured to guide the trolley across the track gap while maintaining wireless communication for the workspace, and generally includes a first track transition element, a second track transition element, a first trolley slide plate, and a second trolley slide plate. The first track transition element may be engaged with the first track segment of the waveguide assembly, and the second track transition element may be engaged with the second track segment of the waveguide assembly. The first trolley slide plate may be coupled to a first surface of the trolley and the second trolley slide plate may be coupled to a second surface of the trolley. The first track transition element may be configured to receive the first trolley slide plate and the second trolley slide plate as the trolley is moved from the first track segment of the waveguide assembly onto and across the first track transition element. In this manner, the first track transition element may guide the first trolley slide plate and the second trolley slide plate as the trolley is moved towards and across the track gap to the second track transition element. The second track transition element may be configured to receive the first trolley slide plate and the second trolley slide plate as the trolley is moved from the first track transition element to the second track transition element. Further, the second track transition element may align the antenna with the second antenna slot of the second track segment of the waveguide assembly to transfer the trolley to the second track segment of the waveguide assembly.

Related methods are also disclosed. In an example of a method of transferring a trolley of a waveguide assembly from a first track segment to a second track segment, the method may include securing a first trolley slide plate to a first surface of the trolley, securing a second trolley slide plate to a second surface of the trolley, engaging a first track transition element with a distal end of the first track segment, engaging a second track transition element with a proximal end of the second track segment, and then moving the trolley across a transition gap between the first and second track transition elements. For example, the trolley may be engaged with the first track segment such that one or more wheels of the trolley roll along the first track segment as the trolley is selectively moved along the first track segment. The first trolley slide plate and the second trolley slide plate are generally spaced apart from the first track segment when the trolley is engaged with the first track segment. One or more wheels of the trolley may be lifted off the first track segment by selectively moving the trolley towards the first track transition element until the first trolley slide plate and the second trolley slide plate are received by the first track transition element. The trolley may be selectively moved along the first track transition element and towards the second track transition element until the trolley passes over the transition gap between the first track transition element and the second track transition element, and until the first trolley slide plate and the second trolley slide plate are received by the second track transition element. An antenna of the trolley may be aligned with an antenna slot of the second track segment such that the antenna is received by the antenna slot when the trolley is selectively moved onto the second track segment from the second track transition element, via a central groove of the second track transition element. The one or more wheels of the trolley may be engaged with the second track segment to complete the transition.

DESCRIPTION

Figure 1:
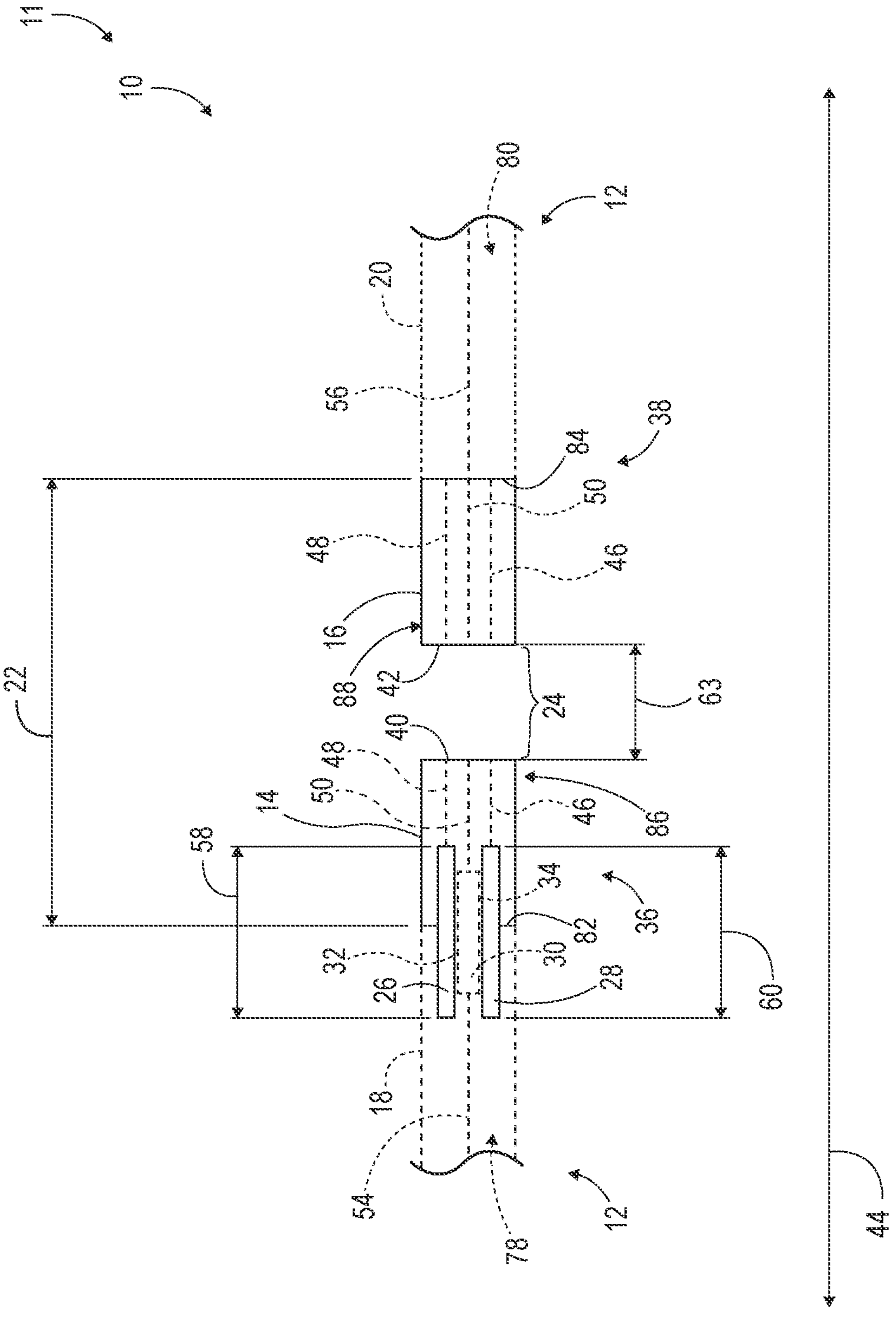
FIG. 1 is a schematic representation of non-exclusive examples of transition systems according to the present disclosure.
Figure 2:
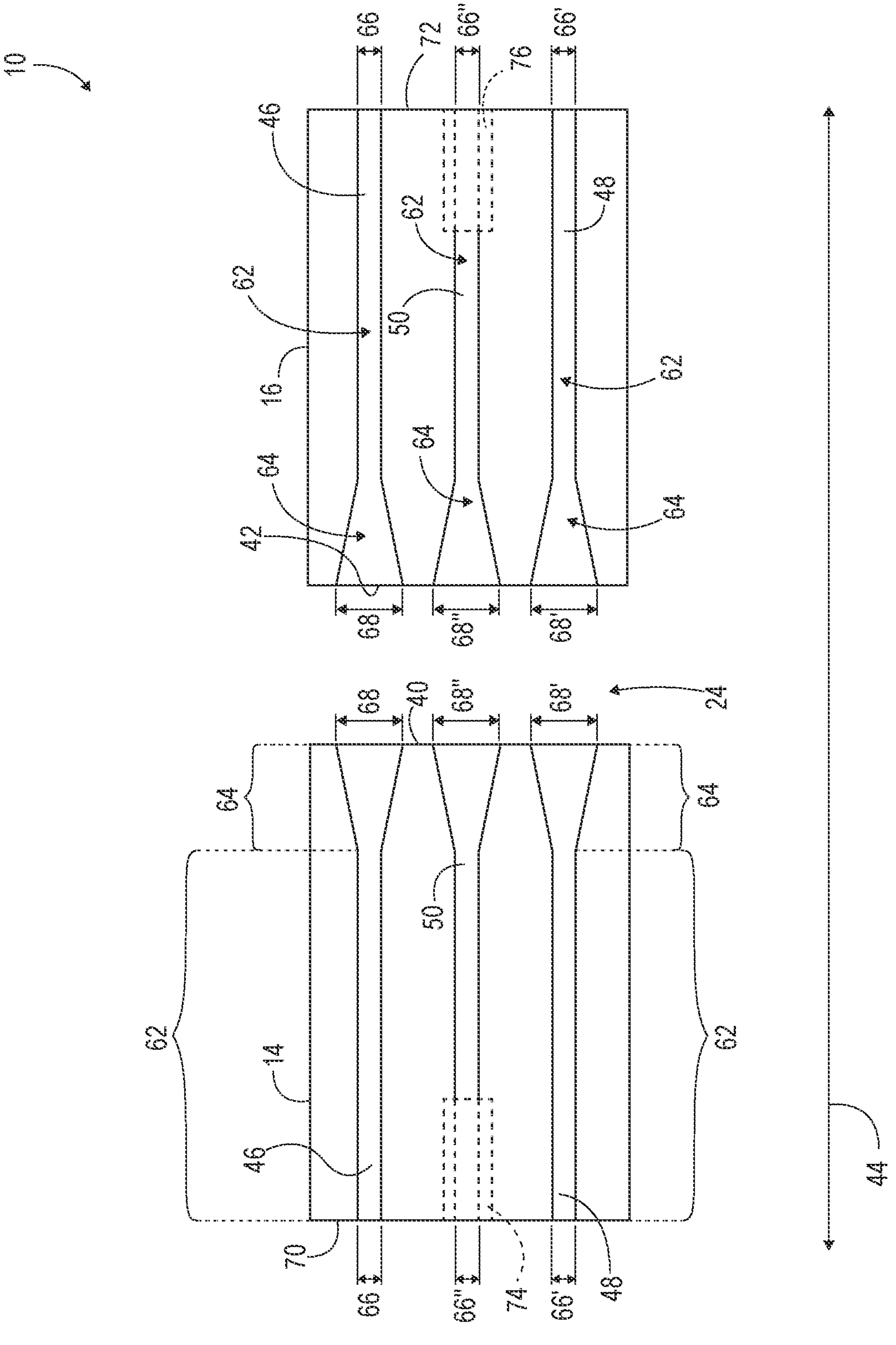
FIG. 2 is a schematic representation of non-exclusive examples of transition systems according to the present disclosure.

FIGS. 1-2 provides a schematic representation of illustrative, non-exclusive examples of transition systems 10 according to the present disclosure, and may not be drawn to scale. Elements that serve a similar, or at least substantially similar, purpose are labeled with like numbers in each of FIGS. 1-2, and these elements may not be discussed in detail herein with reference to each of FIGS. 1-2. Similarly, all elements may not be labeled in each of FIGS. 1-2, but reference numerals associated therewith may be utilized herein for consistency. Elements, components, and/or features that are discussed herein with reference to one or more of FIGS. 1-2 may be included in and/or utilized with any of FIGS. 1-2 without departing from the scope of the present disclosure. In general, elements that are likely to be included in a given (i.e., a particular) example are illustrated in solid lines, while elements that are optional to a given example are illustrated in dashed lines. However, elements that are shown in solid lines are not essential to all examples, and an element shown in solid lines may be omitted from a particular example without departing from the scope of the present disclosure.

With reference to FIG. 1, transition systems 10 are configured to guide a trolley 30 of a waveguide assembly 12 across a track gap 22 between a first track segment 18 and a second track segment 20 of waveguide assembly 12. Transition system 10 includes a first track transition element 14, a second track transition element 16, a first trolley slide plate 26, and a second trolley slide plate 28. First track transition element 14 and second track transition element 16 are configured to engage with waveguide assembly 12. For example, first track transition element 14 is generally engaged with (or configured to engage with) first track segment 18, and second track transition element 16 is generally engaged with (or configured to engage with) second track segment 20. First track transition element 14 is generally positioned on (or configured to be positioned on) a first side 36 of track gap 22, while second track transition element 16 is generally positioned on (or configured to be positioned on) a second side 38 of track gap 22. First track transition element 14 and second track transition element 16 are positioned with respect to each other (or configured to be positioned with respect to each other) such that a transition gap 24 extends between a gap end 40 of first track transition element 14 and a gap end 42 of second track transition element 16. In other words, transition systems 10 are generally configured such that first track transition element 14 and second track transition element 16 are not in contact with each other, and are spaced apart by transition gap 24, within track gap 22. First track transition element 14 is generally configured to be at least substantially stationary with respect to first track segment 18, and second track transition element 16 is generally configured to be at least substantially stationary with respect to second track segment 20.

First and second trolley slide plates 26, 28 are fixed to trolley 30, or configured to be fixed to trolley 30 of waveguide assembly 12. For example, first trolley slide plate 26 is either fixed to, or configured to be fixed to, a first surface 32 of trolley 30, while second trolley slide plate 28 is either fixed to, or configured to be fixed to, a second surface 34 of trolley 30. In some examples, first trolley slide plate 26 and second trolley slide plate 28 are at least substantially parallel to one another and are disposed on either side of trolley 30. First surface 32 of trolley 30 is generally opposite second surface 34 of trolley 30 such that first trolley slide plate 26 is configured to be fixed to trolley 30 opposite second trolley slide plate 28. Trolley 30 is mobile with respect to first track transition element 14, second track transition element 16, and waveguide assembly 12 (e.g., first track segment 18 and second track segment 20). For example, trolley 30 generally includes wheels that travel along track segments 18, 20 of waveguide assembly 12, with movement of trolley 30 being controlled by movement of a crane cab or other structure within the building environment, or by another component of waveguide assembly 12.

Figure 5:
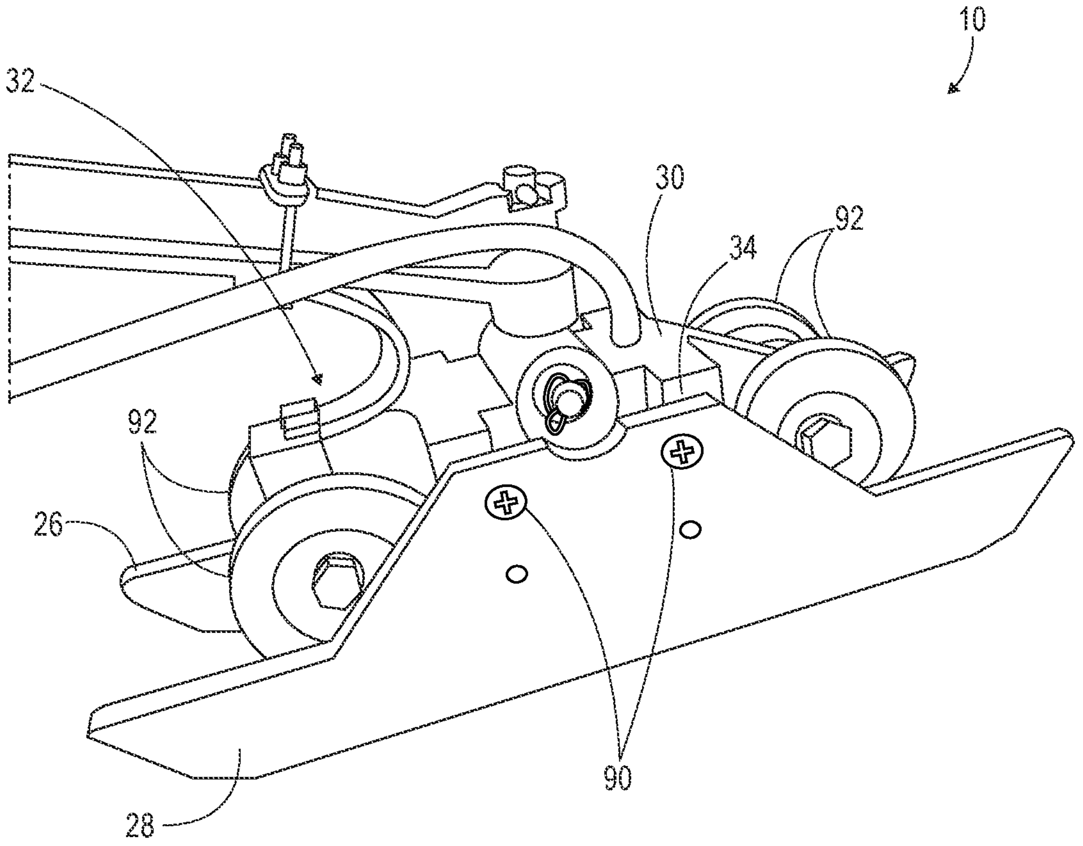
FIG. 5 is a side perspective view of an example of trolley slide plates of a transition system according to the present disclosure.
Figure 6:
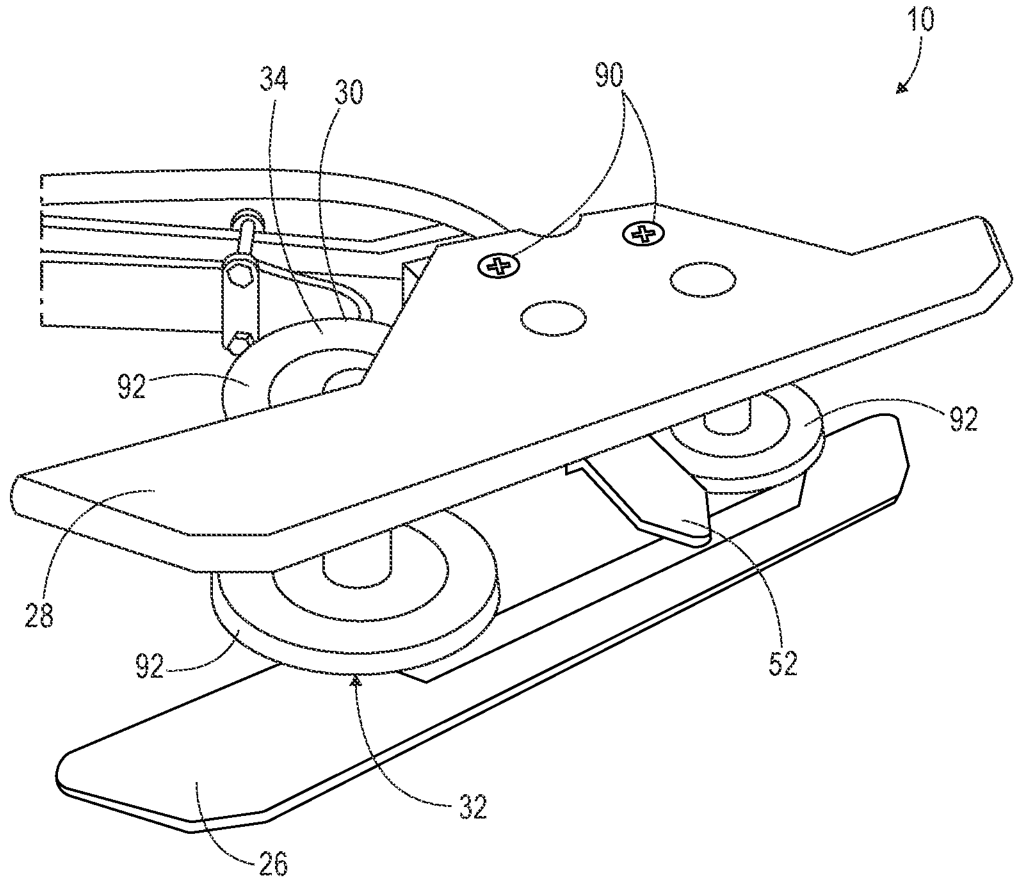
FIG. 6 is a bottom perspective view of an example of trolley slide plates of a transition system according to the present disclosure.

First track transition element 14 is configured to receive trolley slide plates 26, 28 when trolley 30 is moved from first track segment 18 onto and across first track transition element 14. First track transition element 14 guides trolley slide plates 26, 28 as trolley slide plates 26, 28 (and trolley 30) are moved across transition gap 24 to second track transition element 16. Second track transition element 16 is then configured to receive trolley slide plates 26, 28 from first track transition element 14 (trolley slide plates 26, 28 are long enough to span transition gap 24, such that one end of trolley slide plates 26, 28 may be engaged with first track transition element 14 while the opposite end of trolley slide plates 26, 28 may be engaged with second track transition element 16). Specifically, a first length 58 of first trolley slide plate 26 may be greater than a gap length 63 of transition gap 24, and/or a second length 60 of second trolley slide plate 28 may be greater than gap length 63 such that trolley slide plates 26, 28 may be simultaneously engaged with both first and second track transition elements 14, 16 as trolley 30 is moved across transition gap 24. First length 58 of first trolley slide plate 26 will generally be substantially the same as second length 60 of second trolley slide plate 28, but need not necessarily be so. Additionally or alternatively, trolley slide plates 26, 28 may extend past the wheels of trolley 30 (as best seen in FIGS. 5-6).

Once trolley slide plates 26, 28 are received by second track transition element 16 (e.g., as trolley 30 is moved across track gap 22), second track transition element 16 aligns trolley slide plates 26, 28 with respect to second track segment 20 as trolley 30 is moved along second track transition element 16 and onto second track segment 20. Trolley 30 is generally moveable along a longitudinal axis 44 of track segments 18, 20 and track transition elements 14, 16. While transition systems 10 are described herein as facilitating alignment of trolley 30 as it is moved from first track segment 18 and first track transition element 14 to second track transition element 16 and second track segment 20, disclosed transition systems 10 are equally applicable for movement in the opposite direction (e.g., from second track segment 20 and second track transition element 16 to first track transition element 14 and first track segment 18). In other words, trolley 30 may be selectively moved back and forth across transition gap 24, with transition system 10 being configured to provide proper alignment of trolley 30 with respect to waveguide assembly 12 in either direction of travel of trolley 30.

To receive trolley slide plates 26, 28, first track transition element 14 and second track transition element 16 each include a first groove 46 and a second groove 48. Specifically, first groove 46 of first track transition element 14 is configured to receive first trolley slide plate 26 as trolley 30 is moved from first track segment 18 to first track transition element 14, and second groove 48 of first track transition element 14 is configured to receive second trolley slide plate 28 as trolley 30 is moved from first track segment 18 to first track transition element 14. First track transition element 14 also includes a central groove 50 between first groove 46 and second groove 48, with central groove 50 being configured to receive an antenna of trolley 30 as it is moved from first track segment 18 to first track transition element 14. Together, first groove 46, second groove 48, and central groove 50 of first track transition element 14 may be referred to herein as a first guide region 86 of first track transition element 14. Similarly, first groove 46 of second track transition element 16 is configured to receive first trolley slide plate 26 as trolley 30 is moved from first track transition element 14 to second track transition element 16, while second groove 48 of second track transition element 16 is configured to receive second trolley slide plate 28 as trolley 30 is moved from first track transition element 14 to second track transition element 16. Second track transition element 16 also includes a central groove 50 between first groove 46 and second groove 48, with central groove 50 being configured to receive the antenna of trolley 30 as it is moved from first track transition element 14 to second track transition element 16. Together, first groove 46, second groove 48, and central groove 50 of second track transition element 16 may be referred to herein as a second guide region 88 of second track transition element 16.

The use of disclosed transition systems 10 may improve reliability of waveguide assemblies 12, reduce production interruptions, increase productivity, and/or create cost and/or schedule savings in production. Additionally or alternatively, disclosed transition systems 10 may enable a much more compact transition than provided by existing solutions. Transition systems 10 may be provided as a retrofit kit comprising trolley slide plates 26, 28 and track transition elements 14, 16 that can be added to existing trolleys and waveguide assemblies. In some examples, transition systems 10 may be provided as an entire system of trolley slide plates 26, 28, trolley 30, track transition elements 14, 16, and waveguide assemblies 12 (e.g., track segments 18, 20), though such systems may include a plurality of trolley slide plates, a plurality of trolleys, a plurality of track transition elements, and/or a plurality of track segments. In some examples, transition systems 10 may be provided as trolley slide plates 26, 28 together with track segments 18, 20 modified with track transition elements 14, 16, or transition systems 10 may be provided as track transition elements 14, 16 together with trolley 30 modified with trolley slide plates 26, 28. Track transition elements 14, 16 and trolley slide plates 26, 28 may be manufactured in any suitable manner, including but not limited to, machining or 3D printing.

In some examples, systems 11 include transition system 10 and waveguide assembly 12. First track segment 18 generally includes a first hollow channel 78 for conducting a wireless signal therein. First antenna slot 54 of first track segment 18 opens into first hollow channel 78, such that an antenna of trolley 30 extends through first antenna slot 54 to reach the wireless signal contained within first hollow channel 78 when trolley 30 is positioned on (e.g., engaged with) first track segment 18. Similarly, second track segment 20 generally includes a second hollow channel 80 for conducting the wireless signal therein. A second antenna slot 56 of second track segment 20 opens into second hollow channel 80, such that the antenna of trolley 30 extends through second antenna slot 56 to reach the wireless signal contained within second hollow channel 80 when trolley 30 is positioned on (e.g., engaged with) second track segment 20. Track gap 22 separates a distal end 82 of first track segment 18 from a proximal end 84 of second track segment 20. Trolley 30 is selectively movable along first track segment 18 and along second track segment 20 to provide wireless communication for a workspace from the wireless signal contained within hollow channels 78, 80. As described herein, transition system 10 is configured to guide trolley 30 across track gap 22 while maintaining wireless communication for the workspace (e.g., by aligning the trolley antenna with second antenna slot 56 of second track segment 20 of waveguide assembly 12 while trolley 30 is transferred to second track segment 20). In some examples, systems 11 include a wireless client that is configured to manage two trolley antennae at once.

FIG. 2 shows a top plan schematic representation of transition systems 10 having first track transition element 14 and second track transition element 16, which are shown on their own (e.g., apart from trolley 30 and waveguide assembly 12), for clarity. First track transition element 14 extends longitudinally from a bridge end 70 to gap end 40, while second track transition element 16 extends longitudinally from a bridge end 72 to gap end 42. Track transition elements 14, 16 are positioned with respect to each other such that gap ends 40, 42 are adjacent transition gap 24 between first and second track transition elements 14, 16. Bridge ends 70, 72 are positioned adjacent track segments of the waveguide assembly and are generally configured to engage with track segments of the waveguide assembly. For example, bridge end 70 of first track transition element 14 may include a first recess 74 configured to receive a portion of first track segment 18 (FIG. 1) of the waveguide assembly, while bridge end 72 of second track transition element 16 may include a second recess 76 configured to receive a portion of second track segment 20 (FIG. 1) of the waveguide assembly. First recess 74 may be at least partially continuous with a central groove 50 of first track transition element 14, such that a trolley antenna of the waveguide assembly may be configured to travel from an antenna slot of first track segment 18 into central groove 50 of first track transition element 14 when the trolley travels from first track segment 18 to first track transition element 14. Similarly, second recess 76 may be at least partially continuous with a central groove 50 of second track transition element 16, such that a trolley antenna of the waveguide assembly may be configured to travel from central groove 50 of second track transition element 16 to an antenna slot of second track segment 20 when the trolley travels from second track transition element 16 to second track segment 20.

As noted above, track transition elements 14, 16 each include a first groove 46, a second groove 48, and central groove 50. First groove 46 is configured to receive first trolley slide plate 26 as trolley 30 is moved across the respective track transition element 14, 16, and second groove 48 is configured to receive second trolley slide plate 28 as trolley 30 is moved across the respective track transition element 14, 16. Central groove 50 is positioned between first groove 46 and second groove 48 in each of first track transition element 14 and second track transition element 16, and may be substantially equidistant between the respective first and second grooves 46, 48. First and second grooves 46, 48 extend longitudinally across first track transition element 14 and second track transition element 16, from the respective bridge end 70, 72 to the respective gap end 40, 42. Central grooves 50 also extend longitudinally, and in some examples may extend from a respective bridge end 70, 72 to a respective gap end 40, 42, though in other examples, central grooves 50 extend along just a portion of first and second track transition elements 14, 16.

First grooves 46, second grooves 48, and central grooves 50 each have a respective parallel portion 62 and a respective flared portion 64. The longitudinal axes of the grooves 46, 48, 50 are generally at least substantially parallel to longitudinal axis 44 of track segments 18, 20 and track transition elements 14, 16. In other words, grooves 46, 48, 50 generally extend in the direction of travel of trolley 30. Flared portions 64 of grooves 46, 48, 50 have an increased width as compared to parallel portions 62, with flared portions 64 flaring out from parallel portions 62 to gradually increase in width between parallel portions 62 and respective gap ends 40, 42 of track transition elements 14, 16. For example, in first track transition element 14, first groove 46 has baseline width 66 in parallel portion 62 that may be substantially constant along parallel portion 62 of first groove 46, while flared portion 64 of first groove 46 has a flared width 68 that increases along flared portion 64 from parallel portion 62 to gap end 40. Similarly, second groove 48 has a baseline width 66' in parallel portion 62 of second groove 48 that may be substantially constant along parallel portion 62, while flared portion 64 of second groove 48 has a flared width 68' that increases along flared portion 64 from parallel portion 62 to gap end 40. Likewise, central groove 50 has baseline width 66" that may be substantially constant along parallel portion 62 of central groove 50, while flared portion 64 of central groove 50 has a flared width 68" that increases along flared portion 64 of central groove 50 from parallel portion 62 of central groove 50 to gap end 40.

Baseline widths 66, 66', 66" may be substantially constant to each other in each of first groove 46, second groove 48, and central groove 50, or the respective grooves may have different respective baseline widths. Similarly, flared widths 68, 68', 68" may follow substantially the same profile in each of first groove 46, second groove 48, and central groove 50, or the respective grooves may flare out to greater or less respective extents. Grooves 46, 48, 50 of second track transition element 16 have the same arrangement, except that flared widths 68, 68', 68" of the respective grooves of second track transition element decrease from gap end 42 to parallel portions 62 of grooves 46, 48, 50 of second track transition element 16. In both first track transition element 14 and second track transition element 16, flared portions 64 of grooves 46, 48, 50 are positioned adjacent transition gap 24. In other words, flared portions 64 of grooves 46, 48, 50 of first track transition element 14 are positioned adjacent gap end 40 of first track transition element 14, while flared portions 64 of grooves 46, 48, 50 of second track transition element 16 are positioned adjacent gap end 42 of second track transition element 16.

Because of the flared portions of grooves 46, 48, 50, and the alignment between antenna slots 54, 56 of track segments 18, 20 and the respective central grooves 50 of track transition elements 14, 16, disclosed transition systems 10 are configured to accommodate misalignment and/or offset between first track segment 18 and second track segment 20 (see FIG. 1) without interrupting travel of trolley 30 from first track segment 18 to second track segment 20 via first track transition element 14 and second track transition element 16. Disclosed transition systems 10 may be configured to guide the trolley across the transition gap when transition gap 24 is up to 2 inches wide, or greater in some examples. Transition system 10 may be configured to be compatible with a plurality of different vendor platforms and waveguide assemblies that require transitions between bridges or adjacent track segments. Further, transition systems 10 may be utilized with a variety of different types of waveguide assemblies, including but not limited to track-based crane communication systems. In a specific example, first track segment 18 may be coupled to a first bridge (not shown) of a track-based crane communication system, and second track segment 20 may be coupled to a second bridge (not shown) of the track-based crane communication system. Trolley 30 may be coupled to a crane cab (not shown) of the track-based crane communication system, with the crane cab towing trolley 30 along with it as the crane cab moves throughout the workspace.

Turning now to FIGS. 3-11, illustrative non-exclusive examples of transition systems 10 are illustrated. Where appropriate, the reference numerals from the schematic illustrations of FIGS. 1-2 are used to designate corresponding parts of FIGS. 3-11; however, the examples of FIGS. 3-11 are non-exclusive and do not limit transition systems 10 to the illustrated examples of FIGS. 3-11. That is, transition systems 10 are not limited to the specific examples illustrated in FIGS. 3-11 and may incorporate any number of the various aspects, configurations, characteristics, properties, etc. of transition systems 10 that are illustrated in and discussed with reference to the schematic representations of FIGS. 1-2 and/or the examples of FIGS. 3-11, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to each of FIGS. 3-11; however, it is within the scope of the present disclosure that the previously discussed features, variants, etc. may be utilized therewith.

Figure 3:
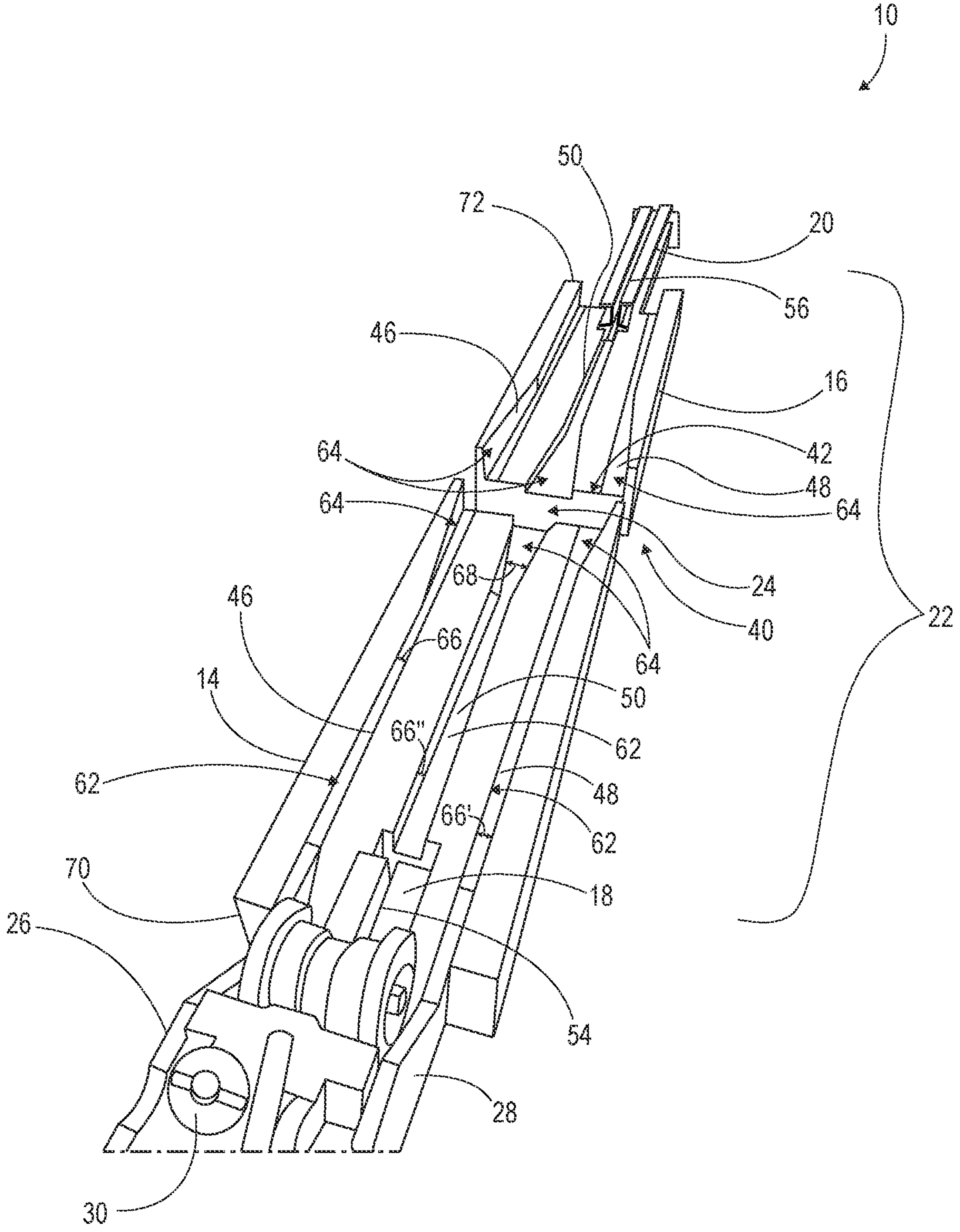
FIG. 3 is a perspective view of an example of a transition system according to the present disclosure, with a trolley approaching a first track transition element.

FIG. 3 shows a perspective view of an example of transition system 10. Trolley 30 is shown on first track segment 18, with first and second trolley slide plates 26, 28 beginning to be moved onto first track transition element 14. Second track transition element 16 is shown on the other side of transition gap 24 from first track transition element 14, with second track segment 20 being engaged with second track transition element 16. As trolley 30 is moved along first track transition element 14, first trolley slide plate 26 slides within first groove 46, and first trolley slide plate 26 continues to slide in first groove 46 of second track transition element 16 once trolley 30 is moved across transition gap 24 and onto second track transition element 16. Similarly, second groove 48 is configured to receive second trolley slide plate 28 as trolley 30 is moved across the respective transition element. For example, as trolley 30 is moved along first track transition element 14, second trolley slide plate 28 slides within second groove 48, and second trolley slide plate 28 continues to slide in second groove 48 of second track transition element 16 once trolley 30 is moved across transition gap 24 and onto second track transition element 16.

Central grooves 50 are configured to receive an antenna 52 of trolley 30 (see FIG. 6) as trolley 30 is moved along the respective track transition element 14, 16. While trolley 30 is engaged with track segments 18, 20, antenna 52 is positioned within a respective antenna slot of the track segment. For example, with reference to FIGS. 3 and 7, first track segment 18 has a first antenna slot 54 that receives the antenna while trolley 30 is positioned on first track segment 18, and second track segment 20 has a second antenna slot 56 that receives the antenna while trolley 30 is positioned on second track segment 20. As trolley 30 is moved from first track segment 18 to first track transition element 14, the antenna is received by central groove 50 of first track transition element 14 from first antenna slot 54. In other words, central groove 50 of first track transition element 14 is configured to align with antenna slot 54 of first track segment 18 such that such that central groove 50 of first track transition element 14 is configured to receive the antenna of trolley 30 once the antenna exits first antenna slot 54 of first track segment 18, as first track transition element 14 receives trolley 30 from first track segment 18.

Similarly, as trolley 30 is moved from second track transition element 16 to second track segment 20, the antenna is aligned by the central groove 50 of second track transition element 16 such that the antenna may be received by second antenna slot 56 of second track segment 20 as trolley 30 is moved onto second track segment 20. In other words, central groove 50 of second track transition element 16 is aligned with second antenna slot 56 of second track segment 20 such that central groove 50 of second track transition element 16 is configured to align the antenna of trolley 30 to be received by second antenna slot 56 of second track segment 20 as second track transition element 16 guides trolley 30 to second track segment 20.

Trolley slide plates 26, 28 have a sufficient length to bridge transition gap 24, which allows transition system 10 to maintain proper alignment of the trolley antenna with respective antenna slots 54, 56 on either side of track gap 22. Specifically, trolley slide plates 26, 28 work together with grooves 46, 48 of track transition elements 14, 16 to guide the trolley antenna 52 into proper alignment with second antenna slot 56 of second track segment 20 as trolley 30 is moved onto second track segment 20. Similarly, when trolley 30 is moving in the opposite direction, trolley slide plates 26, 28 work together with grooves 46, 48 of track transition elements 14, 16 to guide the trolley antenna 52 into proper alignment with first antenna slot 54 of first track segment 18, as trolley 30 is moved onto first track segment 18.

Figure 4:
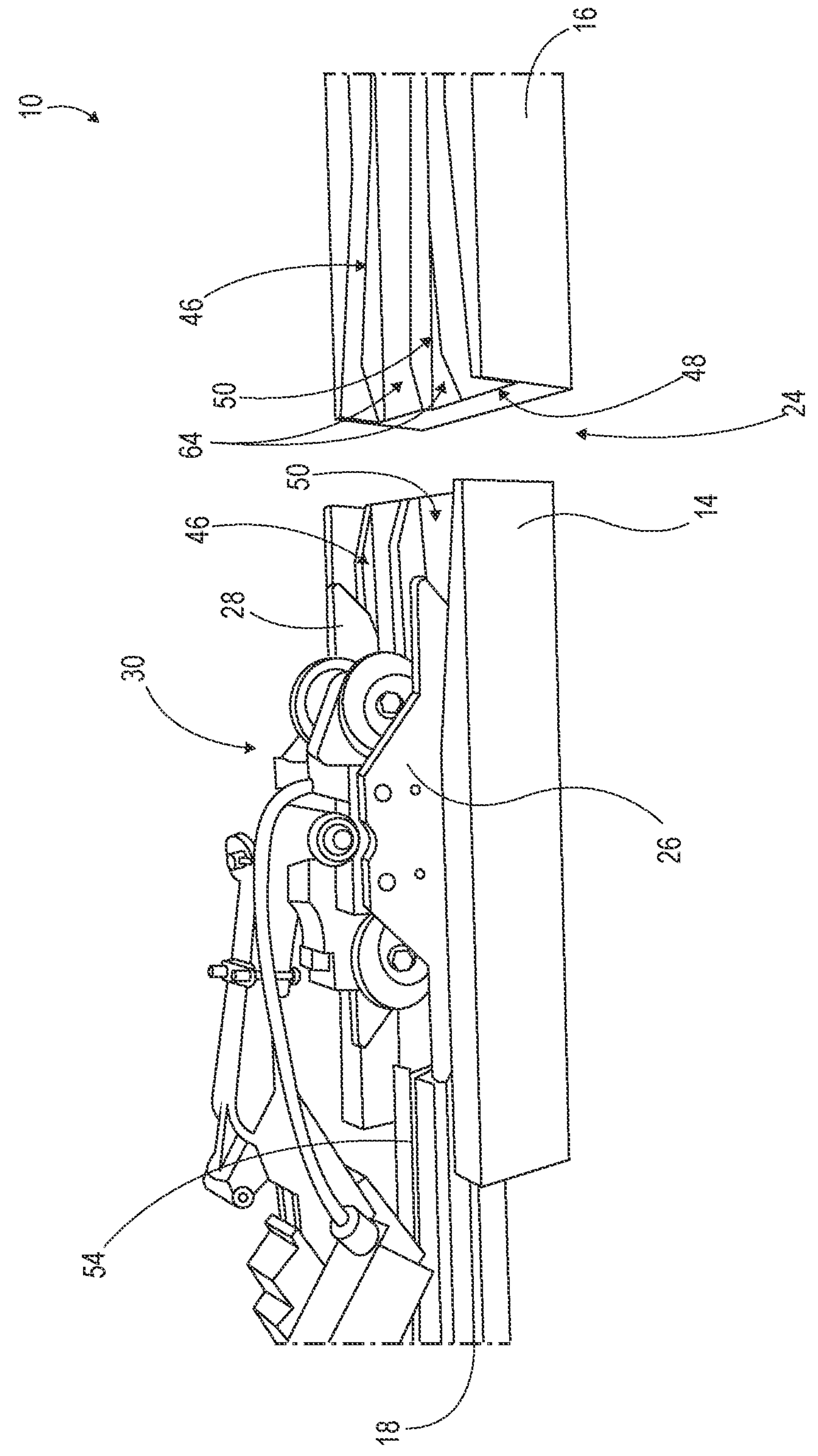
FIG. 4 is a side perspective view of an example of a transition system according to the present disclosure, with a trolley positioned on the first track transition element.

FIG. 4 shows another view of transition system 10, with trolley 30 and trolley slide plates 26, 28 moved further along first track transition element 14 as compared to the position of trolley 30 in FIG. 3. In FIG. 4, trolley 30 and trolley slide plates 26, 28 have moved off of first track segment 18 of waveguide assembly 12, and are positioned entirely on first track transition element 14 with first trolley slide plate 26 sliding in first groove 46, and second trolley slide plate 28 sliding in second groove 48. Second track transition element 16 is shown spaced apart from first track transition element 14 by transition gap 24. Because trolley slide plates 26, 28 are fixed to trolley 30, they move together with trolley 30 as trolley 30 is moved by a crane cab or other component of the associated waveguide assembly. As best seen in FIG. 3, flared portions 64 of grooves 46, 48, 50 of first track transition element 14 face flared portions 64 of grooves 46, 48, 50 of second track transition element 16 to accommodate any offset in alignment between first track transition element 14 and second track transition element 16 as trolley 30 and trolley slide plates 26, 28 are moved onto second track transition element 16 from first track transition element 14. Specifically, first trolley slide plate 26 is received by flared portion 64 of first groove 46 of second track transition element 16, and second trolley slide plate 28 is received by flared portion 64 of second groove 48 of second track transition element 16, as trolley 30 is moved towards and onto second track transition element 16. Because flared portions 64 of grooves 46, 48 of second track transition element 16 get narrower towards bridge end 72 of second track transition element 16 (see FIG. 3) as flared portions 64 taper to parallel portions 62, trolley slide plates 26, 28 are guided into proper alignment with respect to second track segment 20 (FIG. 3) as trolley 30 is moved across second track transition element 16 to second track segment 20.

FIGS. 5 and 6 illustrate two views of an example of trolley slide plates 26, 28 coupled to trolley 30. As shown, first trolley slide plate 26 and second trolley slide plate 28 may be configured to be mounted, screwed, and/or fixed to trolley 30. The example of FIGS. 5-6 shows two screws 90 extending through each trolley slide plate 26, 28 to fix trolley slide plates 26, 28 to either side of trolley 30 (e.g., to first and second surfaces 32, 34 of trolley 30). Antenna 52 of trolley 30 is visible in FIG. 6, with antenna 52 extending out from the middle area of trolley 30, between trolley slide plates 26, 28. Trolley slide plates 26, 28 are shaped and positioned so as not to interfere with free rotation of wheels 92 of trolley 30.

Figure 7:
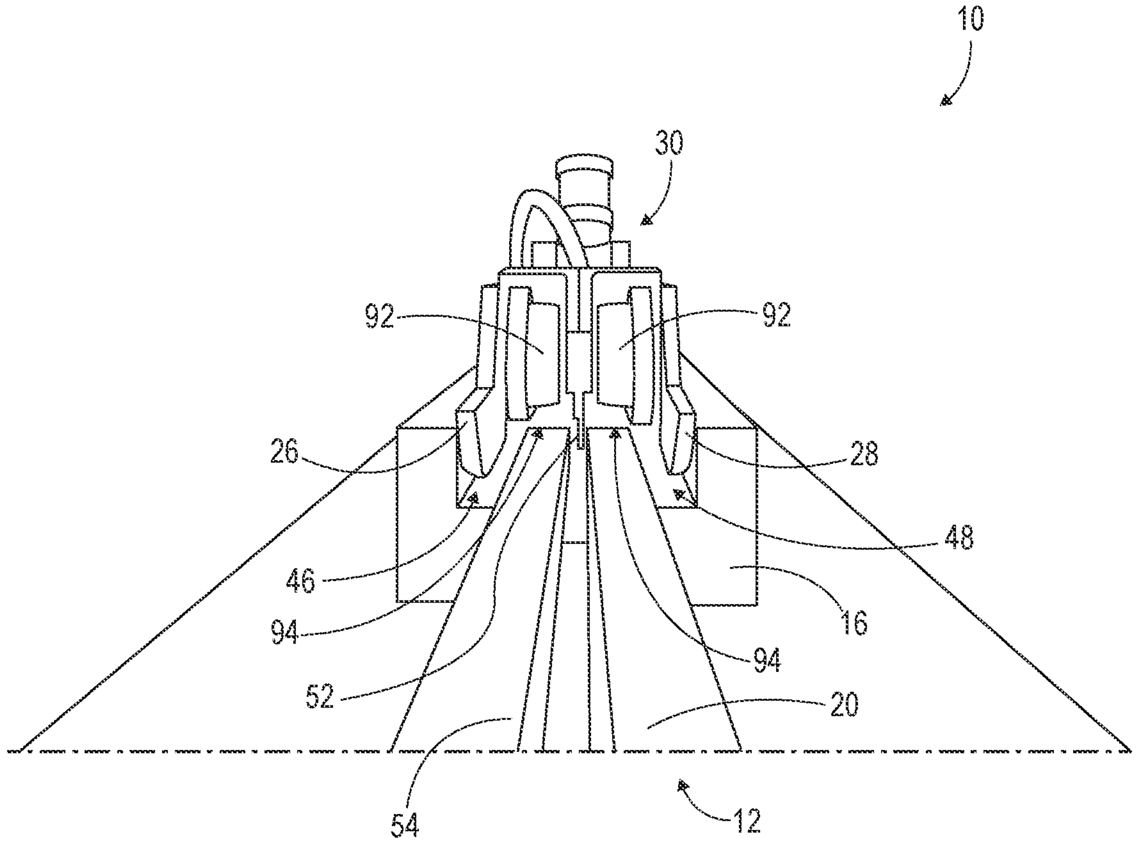
FIG. 7 is a front perspective view of an example of disclosed transition systems, showing an example of positioning of trolley wheels relative to the track transition element when the trolley is on the track transition element.

FIG. 7 illustrates an example of transition system 10 showing a front elevation view of trolley 30 with respect to a track segment (e.g., second track segment 20) when trolley 30 is engaged with a track transition element (e.g., second track transition element 16). Trolley slide plates 26, 28 are configured to create a space between one or more wheels 92 of trolley 30 and a respective track transition element when the trolley slide plates 26, 28 are engaged with the respective track transition element. For example, FIG. 7 shows trolley slide plates 26, 28 engaged with second track transition element 16, with a space 94 between wheels 92 and second track transition element 16. In this manner, trolley slide plates 26, 28 are configured to substantially prevent trolley 30 from contacting the respective track transition element as trolley 30 is moved across it. Keeping trolley 30 and its wheels 92 spaced away from track transition elements 14, 16 as trolley 30 is moved across the track transition elements enables interaction between trolley slide plates 26, 28 and grooves 46, 48 of track transition elements 14, 16 to steer, or guide, trolley 30 into the desired alignment, without interference from wheels 92 or from a crane cab or other structure causing movement of trolley 30.

Figure 8:
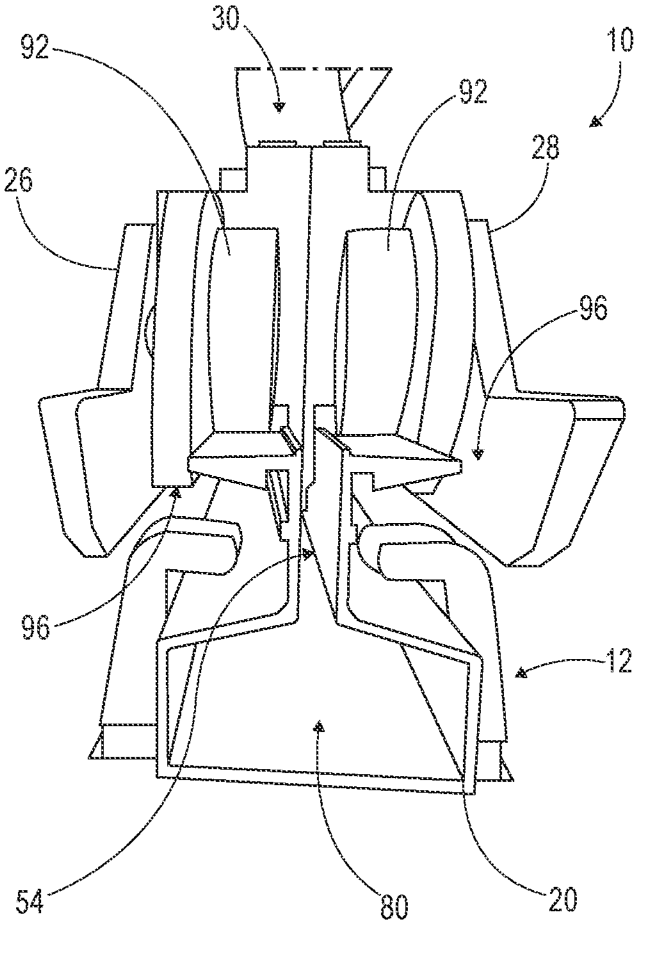
FIG. 8 is a front perspective view of an example of disclosed transition systems, showing an example of positioning of trolley slide plates relative to the track segment when the trolley is on the track segment.

FIG. 8 illustrates an example of transition system 10 showing a front elevation view of trolley 30 with respect to a track segment (e.g., second track segment 20) when trolley 30 is engaged with the track segment. When trolley 30 is engaged with a track segment, trolley slide plates 26, 28 are configured to be spaced apart from the track segment. For example, FIG. 8 shows trolley 30 engaged with second track segment 20, while trolley slide plates 26, 28 are spaced apart from track segment 20 by a gap 96, so as not to interfere with movement of trolley 30 along the track segment. Stated another way, trolley slide plates 26, 28 may be configured to be positioned outside of track segments 18, 20 when trolley 30 is engaged with the track segment. While antenna 52 is not visible from the angle of FIG. 8, antenna 52 extends from trolley 30 into antenna slot 54, which opens into second hollow channel 80, which is designed to contain the wireless signal of waveguide assembly 12. Track segment 20 may include a flanged surface 98 on which wheels 92 of trolley 30 ride (e.g., are in contact with) when trolley 30 is engaged with the track segment.

Figure 9:
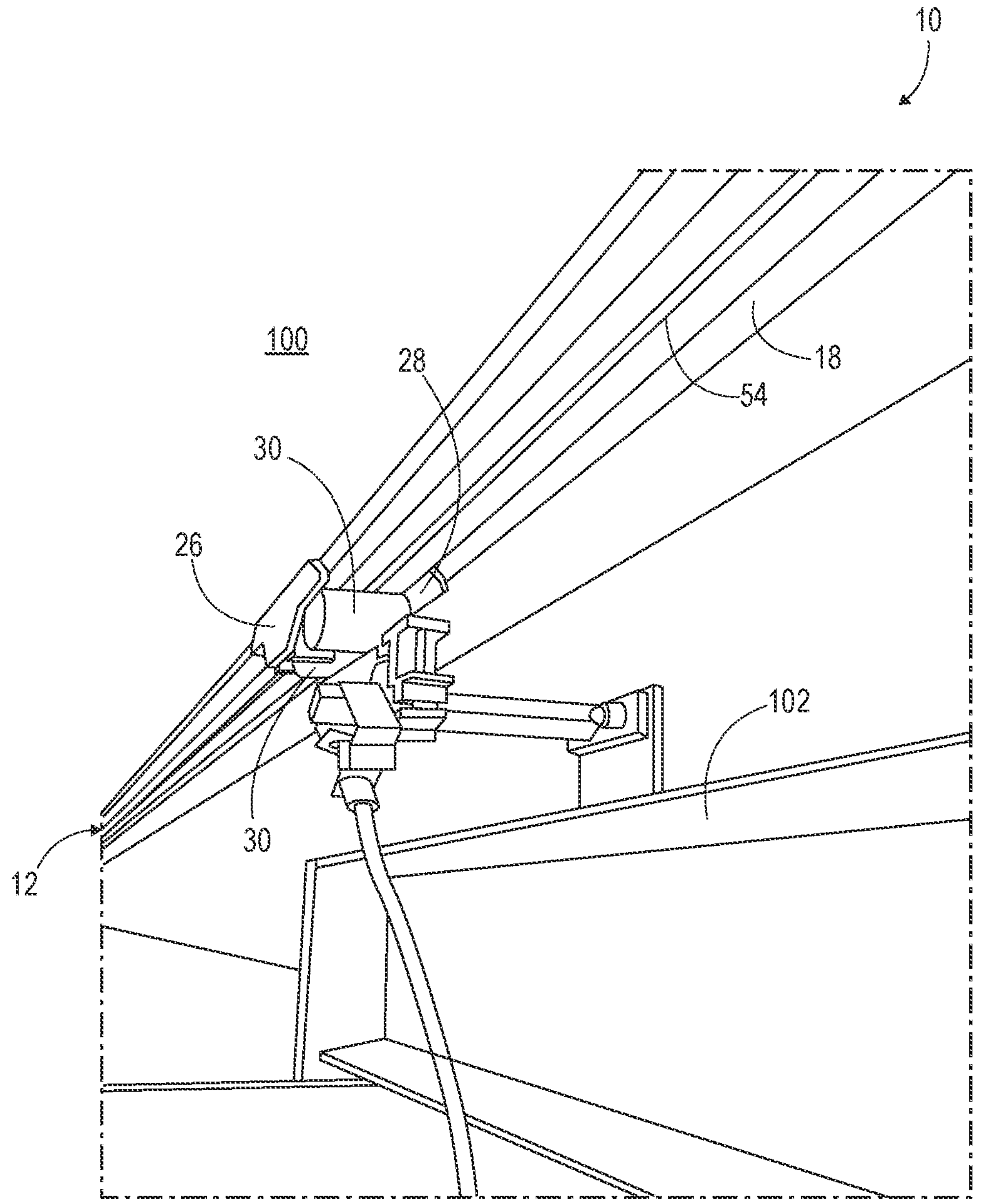
FIG. 9 is a perspective view of an example of a disclosed transition system in use with a crane-based track assembly.

FIG. 9 illustrates an example of transition system 10 in use with a crane-based waveguide assembly 12. In FIG. 9, trolley 30 is shown engaged with first track segment 18. Trolley slide plates 26, 28 are secured to trolley 30, and the trolley antenna (not visible in FIG. 9) extends into first track segment 18 through first antenna slot 54. Trolley 30 is secured to a crane cab 102 in a workspace 100, with crane cab 102 controlling movement of trolley 30 along first track segment 18.

Figure 10:
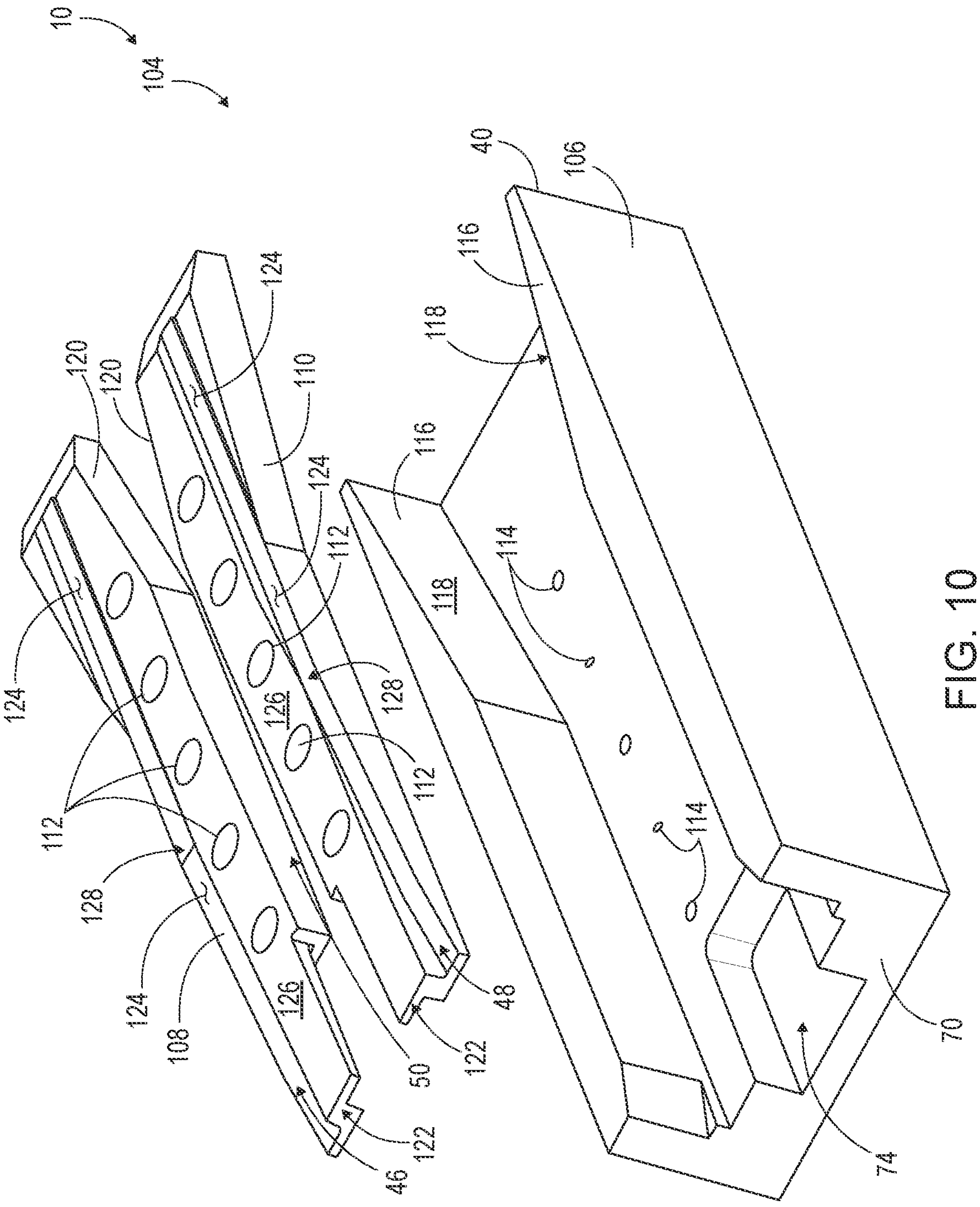
FIG. 10 is an exploded perspective view of an example of disclosed transition systems.
Figure 11:
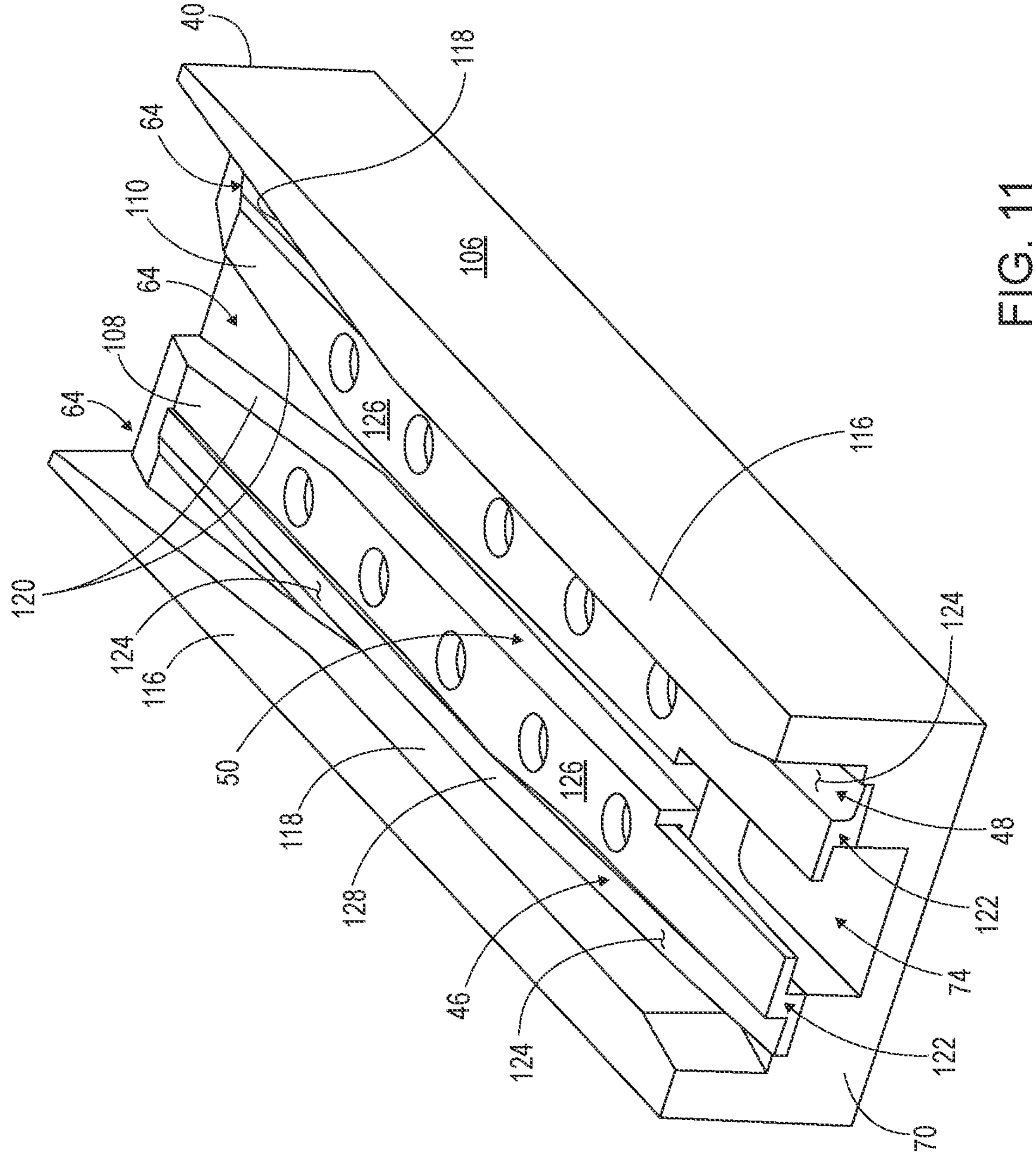
FIG. 11 is a perspective view of the transition system of FIG. 10, shown in an assembled configuration.

FIG. 10 shows another example of transition systems 10 according to the present disclosure, in an exploded view of an example track transition element 104, while FIG. 11 shows the assembled track transition element 104. Track transition element 104 may be used as first track transition element 14 and/or second track transition element 16 in disclosed transition systems 10. While other examples of track transition elements illustrated herein may be formed of a single (e.g., monolithic) piece, FIGS. 10-11 show an example of track transition pieces that may be assembled from a plurality of components, such as a transition base 106 and a first plate 108 and a second plate 110 that are fastened or otherwise coupled to transition base 106. For example, first and second plates 108, 110 may include a plurality of apertures 112 through which fasteners may extend to secure plates 108, 110 to transition base 106 via apertures 114 formed in transition base 106. Additionally or alternatively, first and second plates 108, 110 may be riveted, clamped, joined, and/or adhered to transition base 106, and/or magnets may be used to secure first and second plates 108, 110 to transition base 106.

Like track transition elements 14, 16 described above, track transition element 104 includes first groove 46, second groove 48, and central groove 50, each having a respective flared portion 64 adjacent gap end 40 of track transition element 104. First and second grooves 46, 48 are formed via channels, recesses, or grooves formed in plates 108, 110 and via shaping of an inner surface 118 of sidewalls 116 of transition base 106. For example, thinning of sidewalls 116 adjacent gap end 40 helps to create flared portions 64 of first and second grooves 46, 48. Sidewalls 116 also may be slightly flared adjacent bridge end 70 to help guide trolley slide plates 26, 28 (not pictured in FIGS. 10-11) into grooves 46, 48. Central groove 50 may be formed by a space between first and second plates 108, 110, and defined by the thickness of plates 108, 110. Inner sidewalls 120 of first and second plates 108, 110 may be flared to create flared portion 64 of central groove 50.

Plates 108, 110 may each include a stepped portion, or flange, 122 that is configured to help retain a track segment within recess 74 at bridge end 70 of track transition element 104. For example, flanges 122 may contact the surface of the track segment and/or prevent the track segment from falling out of recess 74 due to gravity when track transition element 104 is in its operational position (which is generally upside down from the orientation shown in the Figures, which show the track transition elements in this orientation for clarity).

In some examples of transition systems 10, first and second grooves 46, 48 may vary in height (e.g., depth) along the length of the track transition element. For example, as shown in track transition element 104 in FIGS. 10-11, a groove surface 124 of each groove 46, 48 may be recessed further away from, or recessed to a lesser extent from, an outer surface 126 of each plate 108, 110 at varying points along the length of track transition element 104 (e.g., along the direction of travel of trolley 30). For example, the depth of grooves 46, 48 (e.g., the recessed distance between groove surface 124 and outer surface 126 of plates 108, 110) may be at a local maxima at bridge end 70, and gradually decrease from bridge end 70 towards gap end 40 until an apex 128 where groove surface 124 may be substantially flush with outer surface 126 of plates 108, 110 in some examples. Then, as grooves 46, 48 continue from apex 128 towards gap end 40, grooves 46, 48 may gradually get deeper again, such that groove surface 124 gets progressively further recessed away from outer surface 126 of plates 108, 110. Thus, as trolley slide plates 26, 28 travel along grooves 46, 48, the distance between trolley 30 and plates 108, 110 may increase or decrease, depending on the depth of grooves 46, 48.

Figure 12:
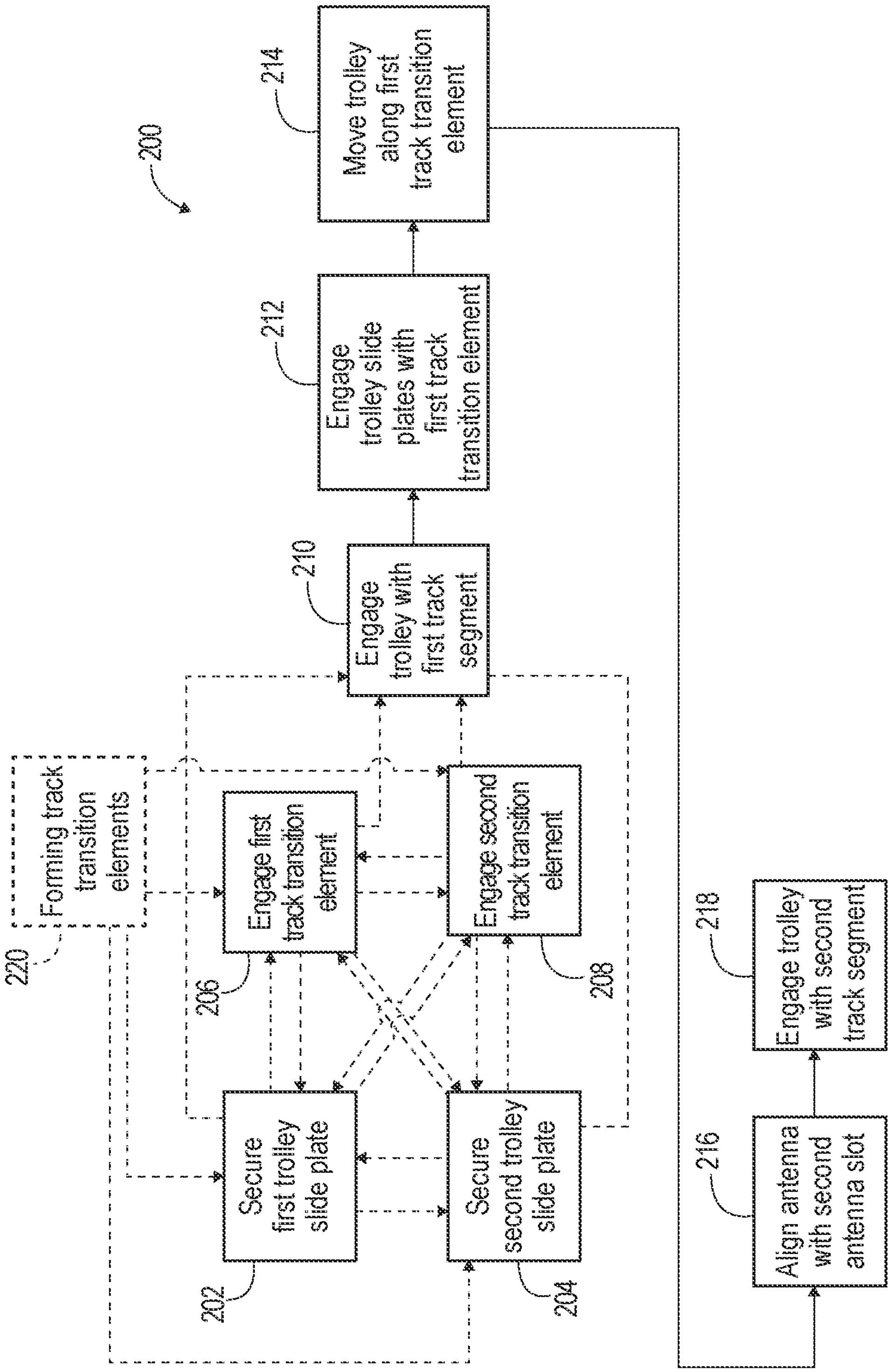
FIG. 12 is a flowchart diagram representing methods according to the present disclosure.

FIG. 12 schematically provides a flowchart that represents illustrative, non-exclusive examples of methods 200 according to the present disclosure. In FIG. 12, some steps are illustrated in dashed boxes indicating that such steps may be optional or may correspond to an optional version of a method according to the present disclosure. That said, not all methods 200 according to the present disclosure are required to include the steps illustrated in solid boxes. The methods 200 and steps illustrated in FIG. 12 are not limiting and other methods and steps are within the scope of the present disclosure, including methods having greater than or fewer than the number of steps illustrated, as understood from the discussions herein.

Methods 200 serve to transfer a trolley (e.g., trolley 30) of a waveguide assembly (e.g., waveguide assembly 12) from a first track segment (e.g., first track segment 18) to a second track segment (e.g., second track segment 20). Methods 200 generally include securing a first trolley slide plate (e.g., first trolley slide plate 26) to a first surface of the trolley at 202 and securing a second trolley slide plate (e.g., second trolley slide plate 28) to a second surface of the trolley at 204. In some methods 200, a trolley may be provided together with trolley slide plates already attached, or together as a kit, while in other methods, trolley slide plates may be provided to be secured to an existing trolley system. Methods 200 further include engaging a first track transition element (e.g., first track transition element 14) with a distal end of the first track segment at 206, and engaging a second track transition element (e.g., second track transition element 16) with a proximal end of the second track segment at 208. In some methods 200, track transition elements may be provided together with track segments, either assembled or as kit, while in other examples, track transition elements may be provided to be secured to an existing assembly of track segments.

Methods 200 also include engaging the trolley with one of the track segments at 210, such that one or more wheels of the trolley roll along the first track segment as the trolley is selectively moved along the first track segment. The trolley slide plates are generally not in contact with the track segment when the trolley is engaged with the track segment, though in some examples, the trolley slide plates may have a low-friction contact with the track segment. Methods subsequently include engaging the trolley slide plates with the first track transition element at 212. As the trolley approaches the first track transition element (which is placed adjacent a track gap between the first track segment and the second track segment), the wheels of the trolley are lifted off, or away from, the first track segment by selectively moving the trolley towards the first track transition element until the first trolley slide plate and the second trolley slide plate are received by the first track transition element (e.g., received within first and second grooves 46, 48 of the first track transition element). Specifically, the sizing of the trolley slide plates and the positioning of the track transition element relative to the track segment result in lifting the trolley wheels off of the first track segment once the trolley slide plates engage the grooves of the first track transition element. The trolley is then selectively moved along the first track transition element and towards the second track transition element, at 214, until the trolley passes over a transition gap between the first track transition element and the second track transition element, and until the first trolley slide plate and the second trolley slide plate are received by the second track transition element. Once the trolley slides plates are engaged with the second track transition element, the trolley is moved further along the second track transition element towards the second track segment. The second track transition element aligns an antenna of the trolley (e.g., antenna 52) with an antenna slot of the second track segment (e.g., second antenna slot 56), at 216, such that the antenna is received by the antenna slot when the trolley is selectively moved onto the second track segment from the second track transition element. Alignment of the antenna with the antenna slot of the second track segment at 216 is accomplished via the antenna traveling along a central groove of the second track transition element and the trolley slide plates being aligned by the first and second grooves of the second track transition element. As the trolley is moved into engagement with the second track segment, at 218, the wheels of the trolley are engaged with the second track segment.

To engage the first track transition element with the first track segment at 206, the distal end of the first track segment may be inserted into a recess in the first track transition element (e.g., recess 74). Similarly, to engage the second track transition element with the second track segment at 208, the proximal end of the second track segment may be inserted into a recess in the second track transition element (e.g., recess 76).

In some examples, methods 200 include forming the track transition elements, at 220, which may be first and second track transition elements, and/or a larger plurality of track transition elements. Forming each track transition element at

220 may include forming a first groove configured to receive the first trolley slide plate as the trolley is moved onto the track transition element, forming a second groove configured to receive the second trolley slide plate as the trolley is moved onto the track transition element, and forming a central groove configured to receive the antenna of the trolley as the trolley is moved onto the track transition element. In some examples, forming the track transition elements at 220 may include securing two plates (e.g., plates 108, 110) to a transition base (e.g., transition base 106) to form the track transition element.

Illustrative, non-exclusive examples of inventive subject matter according to the present disclosure are described in the following enumerated paragraphs:

A1. A transition system for a waveguide assembly, the transition system comprising:

- a first track transition element configured to engage with the waveguide assembly, wherein the first track transition element is configured to be positioned on a first side of a track gap between a first track segment and a second track segment of the waveguide assembly;
- a second track transition element configured to engage with the waveguide assembly, wherein the second track transition element is configured to be positioned on a second side of the track gap between the first track segment and the second track segment of the waveguide assembly, and wherein the first track transition element is positioned with respect to the second track transition element such that a transition gap extends between a gap end of the first track transition element and a gap end of the second track transition element;
- a first trolley slide plate configured to be fixed to a first surface of a trolley of the waveguide assembly, wherein the trolley is mobile with respect to the first track transition element, the second track transition element, and the waveguide assembly;
- a second trolley slide plate configured to be fixed to a second surface of the trolley of the waveguide assembly, wherein the first track transition element is configured to receive the first trolley slide plate and the second trolley slide plate when the trolley is moved from the first track segment of the waveguide assembly onto and across the first track transition element, wherein the first track transition element is configured to guide the first trolley slide plate and the second trolley slide plate as the first trolley slide plate and the second trolley slide plate are moved across the transition gap to the second track transition element, wherein the second track transition element is configured to receive the first trolley slide plate and the second trolley slide plate from the first track transition element, and wherein the second track transition element is configured to align the first trolley slide plate and the second trolley slide plate with respect to the second track segment when the trolley is moved from the second track transition element to the second track segment of the waveguide assembly.

A1.1 The transition system of paragraph A1, wherein a first length of the first trolley slide plate is greater than a gap length of the transition gap, and wherein a second length of the second trolley slide plate is also greater than the gap length.

A2. The transition system of paragraph A1 or A1.1, wherein the first track transition element comprises a first guide region, comprising:

- a first groove configured to receive the first trolley slide plate;
- a second groove configured to receive the second trolley slide plate; and
- a central groove configured to receive an antenna of the trolley from a first antenna slot of the first track transition element.

A2.1. The transition system of paragraph A2, wherein the first groove and the second groove are mirror images of each other.

A2.2. The transition system of paragraph A2 or A2.1, wherein the first trolley slide plate and the second trolley slide plate are configured to bridge the transition gap and guide the antenna into proper alignment with a second antenna slot of the second track transition element.

A3. The transition system of any of paragraphs A2-A2.2, wherein the central groove is positioned between the first groove and the second groove.

A4 The transition system of any of paragraphs A2-A3, wherein the first groove, the second groove, and the central groove of the first track transition element each comprises a respective parallel portion that has a respective longitudinal axis that is at least substantially parallel to a longitudinal axis of the first track transition element.

A5. The transition system of paragraph A4, wherein the first groove, the second groove, and the central groove each comprises a respective flared portion in which a respective flared width of the first groove, the second groove, and the central groove increases from a respective baseline width of the first groove, the second groove, and the central groove in the parallel portion.

A6. The transition system of paragraph A5, wherein the first track transition element extends longitudinally from a bridge end to the gap end of the first track transition element, and wherein the first groove and the second groove also extend longitudinally across the first track transition element from the bridge end to the gap end of the first track transition element.

A7. The transition system of paragraph A6, wherein respective flared portions of the first groove, the second groove, and the central groove of the first track transition element are positioned adjacent the gap end of the first track transition element.

A8. The transition system of any of paragraphs A1-A7, wherein the gap end of the first track transition element is configured to be positioned adjacent the transition gap.

A9. The transition system of any of paragraphs A1-A8, wherein a/the bridge end of the first track transition element comprises a recess configured to receive a portion of the first track segment of the waveguide assembly therein.

A9.1. The transition system of paragraph A9, wherein the recess of the first track transition element is at least partially continuous with the central groove of the first track transition element.

A10. The transition system of any of paragraphs A1-A9.1, wherein the second track transition element comprises a second guide region, comprising:

- a first groove configured to receive the first trolley slide plate;
- a second groove configured to receive the second trolley slide plate; and
- a central groove configured to receive an/the antenna of the trolley.

A11. The transition system of paragraph A10, wherein the central groove is positioned between the first groove and the second groove.

A12. The transition system of any of paragraphs A10-A11, wherein the first groove, the second groove, and the central groove of the second track transition element each comprises a respective parallel portion that has a respective longitudinal axis that is at least substantially parallel to a longitudinal axis of the second track transition element.

A13. The transition system of paragraph A12, wherein the first groove, the second groove, and the central groove each comprises a respective flared portion in which a respective flared width of the first groove, the second groove, and the central groove increases from a respective baseline width of the first groove, the second groove, and the central groove in the parallel portion.

A14. The transition system of paragraph A13, wherein the second track transition element extends longitudinally from a bridge end to the gap end of the second track transition element, and wherein the first groove and the second groove also extend longitudinally across the second track transition element from the bridge end to the gap end of the second track transition element.

A15. The transition system of paragraph A14, wherein respective flared portions of the first groove, the second groove, and the central groove of the second track transition element are positioned adjacent the gap end of the second track transition element.

A16. The transition system of any of paragraphs A1-A15, wherein the gap end of the second track transition element is configured to be positioned adjacent the transition gap, such that it faces the gap end of the first track transition element.

A17. The transition system of any of paragraphs A1-A16, wherein a/the bridge end of the second track transition element comprises a recess configured to receive a portion of the second track segment of the waveguide assembly therein.

A18. The transition system of paragraph A17, wherein the recess of the second track transition element is at least partially continuous with the central groove of the second track transition element.

A19. The transition system of any of paragraphs A1-A18, wherein the first trolley slide plate and the second trolley slide plate are configured to create a space between one or more wheels of the trolley and the first track transition element when the first trolley slide plate and the second trolley slide plate are engaged with the first track transition element, such that the first trolley slide plate and the second trolley slide plate are configured to substantially prevent the trolley from contacting the first track transition element as the trolley is moved across the first track transition element from a/the bridge end to the gap end of the first track transition element.

A20. The transition system of any of paragraphs A1-A19, wherein the first trolley slide plate and the second trolley slide plate are configured to create a space between one or more wheels of the trolley and the second track transition element when the first trolley slide plate and the second trolley slide plate are engaged with the second track transition element, such that the first trolley slide plate and the second trolley slide plate are configured to substantially prevent the trolley from contacting the second track transition element as the trolley is moved across the second track transition element from the gap end to a/the bridge end of the second track transition element.

A21. The transition system of any of paragraphs A1-A20, wherein the first trolley slide plate and the second trolley slide plate are configured to be spaced apart from the first track segment when the trolley is on the first track segment.

A22. The transition system of any of paragraphs A1-A21, wherein the central groove of the first track transition element is configured to align with a slot of the first track segment such that the central groove of the first track transition element is configured to receive an/the antenna of the trolley once the antenna exits the slot of the first track segment, as the first track transition element receives the trolley from the first track segment.

A23. The transition system of any of paragraphs A1-A22, wherein the central groove of the second track transition element is configured to align with a slot of the second track segment such that the central groove of the second track transition element is configured to align an/the antenna of the trolley to be received by the slot of the second track segment, as the second track transition element guides the trolley to the second track segment.

A24. The transition system of any of paragraphs A1-A23, wherein the first trolley slide plate and the second trolley slide plate are configured to be mounted, screwed, and/or fixed to the trolley.

A25. The transition system of any of paragraphs A1-A24, wherein the first track transition element is configured to be at least substantially stationary with respect to the first track segment.

A26. The transition system of any of paragraphs A1-A25, wherein the second track transition element is configured to be at least substantially stationary with respect to the second track segment.

A27. The transition system of any of paragraphs A1-A26, wherein the first trolley slide plate and the second trolley slide plate are at least substantially parallel to one another.

A28. The transition system of any of paragraphs A1-A27, wherein the first side of the trolley is opposite the second side of the trolley, such that the first trolley slide plate is configured to be fixed to the trolley opposite the second trolley slide plate.

A29. The transition system of any of paragraphs A1-A27, wherein the transition system is configured to accommodate misalignment and/or offset between the first track segment and the second track segment without interrupting travel of the trolley from the first track segment to the second track segment via the first track transition element and the second track transition element.

A30. The transition system of any of paragraphs A1-A29, wherein the transition system is compatible with a plurality of different vendor platforms and waveguide assemblies that require transitions.

A31. The transition system of any of paragraphs A1-A30, wherein the waveguide assembly is a track-based crane communication system.

A32. The transition system of any of paragraphs A1-A31, wherein the transition system is configured to guide the trolley across the transition gap when the transition gap is at least 2 inches wide.

A33. The transition system of any of paragraphs A1-A32, further comprising the trolley, wherein the trolley is outfitted with the first trolley slide plate and the second trolley slide plate.

A34. The transition system of any of paragraphs A1-A33, wherein the first track transition element and the second track transition element are configured to be retrofit to an existing waveguide assembly.

A35. The transition system of any of paragraphs A1-A34, further comprising the waveguide assembly.

B1. A system, comprising:

a waveguide assembly, comprising:

a first track segment comprising a first hollow channel for conducting a wireless signal, and further comprising a first antenna slot through which an antenna of a trolley extends when the trolley is engaged with the first track segment;

a second track segment comprising a second hollow channel for conducting the wireless signal, and further comprising a second antenna slot through which the antenna of the trolley extends when the trolley is engaged with the second track segment, wherein a distal end of the first track segment is spaced apart from a proximal end of the second track segment by a track gap; and the trolley, wherein the trolley is selectively movable along the first track segment, and along the second track segment to provide wireless communication for a workspace from the wireless signal; and a transition system configured to guide the trolley across the track gap while maintaining wireless communication for the workspace, the transition system comprising:

a first track transition element engaged with the first track segment of the waveguide assembly;

a second track transition element engaged with the second track segment of the waveguide assembly;

a first trolley slide plate coupled to a first surface of the trolley;

a second trolley slide plate coupled to a second surface of the trolley, wherein the first track transition element is configured to receive the first trolley slide plate and the second trolley slide plate as the trolley is moved from the first track segment of the waveguide assembly onto and across the first track transition element, wherein the first track transition element guides the first trolley slide plate and the second trolley slide plate as the trolley is moved towards and across the track gap to the second track transition element, wherein the second track transition element is configured to receive the first trolley slide plate and the second trolley slide plate as the trolley is moved from the first track transition element to the second track transition element, and wherein the second track transition element aligns the antenna with the second antenna slot of the second track segment of the waveguide assembly to transfer the trolley to the second track segment of the waveguide assembly.

B2. The system of paragraph B1, wherein the first track transition element comprises a first guide region, comprising:

a first groove configured to receive the first trolley slide plate as the trolley is moved from the first track segment to the first track transition element;

a second groove configured to receive the second trolley slide plate as the trolley is moved from the first track segment to the first track transition element; and a central groove configured to receive the antenna of the trolley as the trolley is moved from the first track segment to the first track transition element.

B3. The system of paragraph B2, wherein the central groove is positioned between the first groove and the second groove.

B4. The system of any of paragraphs B2-B3, wherein the first groove, the second groove, and the central groove of the first track transition element each comprises a respective parallel portion that has a respective longitudinal axis that is at least substantially parallel to a longitudinal axis of the first track transition element.

B5. The system of paragraph B4, wherein the first groove, the second groove, and the central groove each comprises a respective flared portion in which a respective flared width of the first groove, the second groove, and the central groove increases from a respective baseline width of the first groove, the second groove, and the central groove in the parallel portion.

B6. The system of paragraph B5, wherein the first track transition element extends longitudinally from a bridge end to a gap end, and wherein each of the first groove, the second groove, and the central groove extends longitudinally across the first track transition element from the bridge end to the gap end of the first track transition element.

B7. The system of paragraph B6, wherein respective flared portions of the first groove, the second groove, and the central groove of the first track transition element are positioned adjacent the gap end of the first track transition element.

B7.1. The system of any of paragraphs B5-B7, wherein the respective flared portion of the first groove, the second groove, and the central groove are configured to account for mismatch between the first track transition element and the second track transition element across the track gap.

B7.2. The system of any of paragraphs B5-B7, wherein the respective flared portion of the first groove, the second groove, and the central groove are configured to prevent collisions or equipment damage as the trolley crosses the track gap.

B8. The system of any of paragraphs B1-B7.2, wherein the first track transition element is positioned with respect to the second track transition element such that a transition gap extends between a gap end of the first track transition element and a gap end of the second track transition element.

B8.1. The system of any of paragraphs B1-B7, wherein a/the gap end of the first track transition element is configured to be positioned adjacent a/the transition gap between the first track transition element and the second track transition element.

B9. The system of any of paragraphs B1-B8.1, wherein a/the bridge end of the first track transition element comprises a recess, and where a portion of the first track segment of the waveguide assembly is received within the recess.

B9.1. The system of paragraph B9, wherein the recess of the first track transition element is at least partially continuous with the central groove of the first track transition element.

B10. The system of any of paragraphs B1-B9.1, wherein the second track transition element comprises a second guide region, comprising:

a first groove configured to receive the first trolley slide plate as the trolley is moved from the first track transition element to the second track segment;

a second groove configured to receive the second trolley slide plate as the trolley is moved from the first track transition element to the second track segment; and a central groove configured to receive the antenna of the trolley as the trolley is moved from the first track transition element to the second track segment.

B11. The system of paragraph B10, wherein the central groove is positioned between the first groove and the second groove.

B12. The system of any of paragraphs B10-B11, wherein the first groove, the second groove, and the central groove of the second track transition element each comprises a respective parallel portion that has a respective longitudinal axis that is at least substantially parallel to a longitudinal axis of the second track transition element.

B13. The system of paragraph B12, wherein the first groove, the second groove, and the central groove each comprises a respective flared portion in which a respective flared width of the first groove, the second groove, and the central groove increases from a respective baseline width of the first groove, the second groove, and the central groove in the parallel portion.

B14. The system of paragraph B13, wherein the second track transition element extends longitudinally from a bridge end to a/the gap end of the second track transition element, and wherein each of the first groove, the second groove, and the central groove extends longitudinally across the second track transition element from the bridge end to the gap end of the second track transition element.

B15. The system of paragraph B14, wherein respective flared portions of the first groove, the second groove, and the central groove of the second track transition element are positioned adjacent the gap end of the second track transition element.

B16. The system of any of paragraphs B1-B15, wherein a/the gap end of the second track transition element is positioned adjacent a/the transition gap between the first track transition element and the second track transition element, such that it faces a/the gap end of the first track transition element.

B17. The system of any of paragraphs B1-B16, wherein a/the bridge end of the second track transition element comprises a recess, and where a portion of the second track segment of the waveguide assembly is received within the recess of the second track transition element.

B18. The system of paragraph B17, wherein the recess of the second track transition element is at least partially continuous with the central groove of the second track transition element.

B19. The system of any of paragraphs B1-B18, wherein the first trolley slide plate and the second trolley slide plate create a space between one or more wheels of the trolley and the first track transition element when the trolley moves across the first track transition element, such that the first trolley slide plate and the second trolley slide plate substantially prevent the trolley from contacting the first track transition element as the trolley is moved across the first track transition element from a/the bridge end to a/the gap end of the first track transition element.

B20. The system of any of paragraphs B1-B19, wherein the first trolley slide plate and the second trolley slide plate create a space between one or more wheels of the trolley and the second track transition element when the trolley is engaged with the second track transition element, such that the first trolley slide plate and the second trolley slide plate substantially prevent the trolley from contacting the second track transition element as the trolley is moved across the second track transition element from a/the gap end to a/the bridge end of the second track transition element.

B21. The system of any of paragraphs B1-B20, wherein the first trolley slide plate and the second trolley slide plate are configured to be spaced apart from the first track segment when the trolley is on the first track segment.

B21.1. The system of any of paragraphs B1-B21, wherein the first trolley slide plate and the second trolley slide plate are configured to be spaced apart from the second track segment when the trolley is on the second track segment.

B22. The system of any of paragraphs B1-B21.1, wherein the central groove of the first track transition element is aligned with the first antenna slot of the first track segment such that the central groove of the first track transition element is configured to receive the antenna of the trolley once the antenna exits the first antenna slot of the first track segment, as the trolley is selectively moved to the first track transition element from the first track segment.

B23. The system of any of paragraphs B1-B22, wherein the central groove of the second track transition element is aligned with the second antenna slot of the second track segment such that the central groove of the second track transition element is configured to align the trolley with respect to the second track segment such that the antenna of the trolley is received by the second antenna slot of the second track segment, as the trolley is selectively moved from the second track transition element to the second track segment.

B24. The system of any of paragraphs B1-B23, wherein the first trolley slide plate and the second trolley slide plate are mounted, screwed, and/or fixed to the trolley.

B25. The system of any of paragraphs B1-B24, wherein the first track transition element is at least substantially stationary with respect to the first track segment.

B26. The system of any of paragraphs B1-B25, wherein the second track transition element is at least substantially stationary with respect to the second track segment.

B27. The system of any of paragraphs B1-B26, wherein the first trolley slide plate and the second trolley slide plate are at least substantially parallel to one another.

B28. The system of any of paragraphs B1-B27, wherein the first side of the trolley is opposite the second side of the trolley, such that the first trolley slide plate is fixed to the trolley opposite the second trolley slide plate.

B29. The system of any of paragraphs B1-B27, wherein the transition system is configured to accommodate misalignment and/or offset between the first track segment and the second track segment without interrupting travel of the trolley from the first track segment to the second track segment via the first track transition element and the second track transition element.

B30. The system of any of paragraphs B1-B29, wherein the transition system is configured to guide the trolley across a/the transition gap between the first track transition element and the second track transition element when the transition gap is at least 2 inches wide.

B31. The system of any of paragraphs B1-B30, wherein the waveguide assembly is a track-based crane communication system.

B32. The system of paragraph B31, wherein the first track segment is coupled to a first bridge of the track-based crane communication system, and wherein the second track segment is coupled to a second bridge of the track-based crane communication system.

B33. The system of paragraph B31 or B32, wherein the trolley is coupled to a crane cab of the track-based crane communication system, and wherein the crane cab tows the trolley along with it as the crane cab moves throughout the workspace.

B34. The system of any of paragraphs B1-B33, wherein one or more wheels of the trolley contact the first track segment when the trolley is engaged with the first track segment, and wherein the one or more wheels of the trolley contact the second track segment when the trolley is engaged with the second track segment.

B35. The system of any of paragraphs B1-B34, wherein the first trolley slide plate and the second trolley slide plate span a/the transition gap between the first track transition element and the second track transition element as the trolley is moved from the first track transition element to the second track transition element.

C1. A method of transferring a trolley of a waveguide assembly from a first track segment to a second track segment, the method comprising:

securing a first trolley slide plate to a first surface of the trolley;

securing a second trolley slide plate to a second surface of the trolley;

engaging a first track transition element with a distal end of the first track segment;

engaging a second track transition element with a proximal end of the second track segment;

engaging the trolley with the first track segment such that one or more wheels of the trolley roll along the first track segment as the trolley is selectively moved along the first track segment, wherein the first trolley slide plate and the second trolley slide plate are spaced apart from the first track segment when the trolley is engaged with the first track segment;

lifting the one or more wheels of the trolley off the first track segment by selectively moving the trolley towards the first track transition element until the first trolley slide plate and the second trolley slide plate are received by the first track transition element;

selectively moving the trolley along the first track transition element and towards the second track transition element until the trolley passes over a transition gap between the first track transition element and the second track transition element, and until the first trolley slide plate and the second trolley slide plate are received by the second track transition element;

aligning an antenna of the trolley with an antenna slot of the second track segment such that the antenna is received by the antenna slot when the trolley is selectively moved onto the second track segment from the second track transition element; and engaging the one or more wheels of the trolley with the second track segment.

C2. The method of paragraph C1, wherein the engaging the first track transition element with the distal end of the first track segment comprises inserting the distal end of the first track segment into a recess formed in the first track transition element.

C3. The method of paragraph C1 or C2, further comprising forming the first track transition element, wherein the forming the first track transition element comprises:

forming a first groove configured to receive the first trolley slide plate as the trolley is moved from the first track segment to the first track transition element;

forming a second groove configured to receive the second trolley slide plate as the trolley is moved from the first track segment to the first track transition element; and forming a central groove configured to receive the antenna of the trolley as the trolley is moved from the first track segment to the first track transition element.

C4. The method of paragraph C3, wherein the first track transition element extends longitudinally from a bridge end to a gap end, and wherein each of the first groove, the second groove, and the central groove extends longitudinally across the first track transition element from the bridge end to the gap end of the first track transition element.

C5. The system of paragraph C4, further comprising forming respective flared portions of the first groove, the second groove, and the central groove of the first track transition element, wherein the respective flared portions of the first groove, the second groove, and the central groove are positioned adjacent the gap end of the first track transition element.

C6. The method of any of paragraphs C1-C5, wherein the engaging the second track transition element with the proximal end of the second track segment comprises inserting the proximal end of the second track segment into a recess formed in the second track transition element.

C7. The method of any of paragraphs C1-C6, further comprising forming the second track transition element, wherein the forming the second track transition element comprises:

forming a first groove configured to receive the first trolley slide plate as the trolley is moved from the first track transition element to the second track transition element;

forming a second groove configured to receive the second trolley slide plate as the trolley is moved from the first track transition element to the second track transition element; and forming a central groove configured to receive the antenna of the trolley as the trolley is moved from the first track transition element to the second track transition element.

C8. The method of paragraph C7, wherein the second track transition element extends longitudinally from a bridge end to a gap end, and wherein each of the first groove, the second groove, and the central groove extends longitudinally across the second track transition element from the bridge end to the gap end of the second track transition element.

C9. The method of paragraph C8, further comprising forming respective flared portions of the first groove, the second groove, and the central groove of the second track transition element, wherein the respective flared portions of the first groove, the second groove, and the central groove are positioned adjacent the gap end of the second track transition element.

C10. The method of any of paragraphs C1-C9, further comprising positioning a/the gap end of the second track transition element adjacent a/the transition gap between the first track transition element and the second track transition element, such that the gap end of the second track transition element faces a/the gap end of the first track transition element.

D1. A method, comprising incorporating the transition system of any of paragraphs A1-A35 with the waveguide assembly.

E1. A track-based crane communication system comprising the transition system of any of paragraphs A1-A35.

F1. The use of the transition system of any of paragraphs A1-A35, and/or the system of any of paragraphs B1-B35 to move the trolley across the track gap between the first track segment and the second track segment.

As used herein, the terms "selective" and "selectively," when modifying an action, movement, configuration, or other activity of one or more components or characteristics of an apparatus, mean that the specific action, movement, configuration, or other activity is a direct or indirect result of dynamic processes and/or user manipulation of an aspect of, or one or more components of, the apparatus. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one example, to at least one, optionally including more than one, A, with no B present (and optionally including entities other than B); in another example, to at least one, optionally including more than one, B, with no A present (and optionally including entities other than A); in yet another example, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, or A, B, and C together, and optionally any of the above in combination with at least one other entity.

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, examples, and/or methods according to the present disclosure, are intended to convey that the described component, feature, detail, structure, example, and/or method is an illustrative, non-exclusive example of components, features, details, structures, examples, and/or methods according to the present disclosure. Thus, the described component, feature, detail, structure, example, and/or method is not intended to be limiting, required, or exclusive/exhaustive; and other components, features, details, structures, examples, and/or methods, including structurally and/or functionally similar and/or equivalent components, features, details, structures, examples, and/or methods, are also within the scope of the present disclosure.

The invention claimed is:

1. A transition system for a waveguide assembly, the transition system comprising:

a first track transition element configured to engage with the waveguide assembly, wherein the first track transition element is configured to be positioned on a first side of a track gap between a first track segment and a second track segment of the waveguide assembly;

a second track transition element configured to engage with the waveguide assembly, wherein the second track transition element is configured to be positioned on a second side of the track gap between the first track segment and the second track segment of the waveguide assembly, and wherein the first track transition element is positioned with respect to the second track transition element such that a transition gap extends between a gap end of the first track transition element and a gap end of the second track transition element;

a first trolley slide plate configured to be fixed to a first surface of a trolley of the waveguide assembly, wherein the trolley is mobile with respect to the first track transition element, the second track transition element, and the waveguide assembly;

a second trolley slide plate configured to be fixed to a second surface of the trolley of the waveguide assembly, wherein the first track transition element is configured to receive the first trolley slide plate and the second trolley slide plate when the trolley is moved from the first track segment of the waveguide assembly onto and across the first track transition element, wherein the first track transition element is configured to guide the first trolley slide plate and the second trolley slide plate as the first trolley slide plate and the second trolley slide plate are moved across the transition gap to the second track transition element, wherein the second track transition element is configured to receive the first trolley slide plate and the second trolley slide plate from the first track transition element, and wherein the second track transition element is configured to align the first trolley slide plate and the second trolley slide plate with respect to the second track segment of the waveguide assembly when the trolley is moved from the second track transition element to the second track segment of the waveguide assembly.

2. The transition system according to claim 1, wherein a first length of the first trolley slide plate is greater than a gap length of the transition gap, and wherein a second length of the second trolley slide plate is also greater than the gap length.

3. The transition system according to claim 1, wherein the first track transition element comprises a first guide region, comprising:

a first groove configured to receive the first trolley slide plate;

a second groove configured to receive the second trolley slide plate; and a central groove configured to receive an antenna of the trolley from a first antenna slot of the first track transition element, wherein the central groove is positioned between the first groove and the second groove.

4. The transition system according to claim 3, wherein the first trolley slide plate and the second trolley slide plate are configured to bridge the transition gap and guide the antenna into proper alignment with a second antenna slot of the second track transition element.

5. The transition system according to claim 3, wherein the first groove, the second groove, and the central groove each comprises a respective flared portion in which a respective flared width of the first groove, the second groove, and the central groove increases from a respective baseline width of the first groove, the second groove, and the central groove.

6. The transition system according to claim 5, wherein the first track transition element extends longitudinally from a bridge end to the gap end of the first track transition element, wherein each of the first groove, the second groove, and the central groove extends longitudinally across the first track transition element from the bridge end to the gap end of the first track transition element, and wherein respective flared portions of the first groove, the second groove, and the central groove of the first track transition element are positioned adjacent the gap end of the first track transition element.

7. The transition system according to claim 6, wherein the bridge end of the first track transition element comprises a recess configured to receive a portion of the first track segment of the waveguide assembly therein, and wherein the recess of the first track transition element is at least partially continuous with the central groove of the first track transition element.

8. The transition system according to claim 6, wherein the second track transition element comprises a second guide region, comprising:

a first groove configured to receive the first trolley slide plate;

a second groove configured to receive the second trolley slide plate; and a central groove configured to receive the antenna of the trolley, wherein the central groove is positioned between the first groove and the second groove, wherein the first groove, the second groove, and the central groove of the second track transition element each comprises a respective flared portion in which a respective flared width of the first groove, the second groove, and the central groove of the second track transition element increases from a respective baseline width of the first groove, the second groove, and the central groove of the second track transition element.

9. The transition system according to claim 8, wherein the second track transition element extends longitudinally from a bridge end to the gap end of the second track transition element, and wherein each of the first groove, the second groove, and the central groove of the second track transition element extends longitudinally across the second track transition element from the bridge end to the gap end of the second track transition element, wherein respective flared portions of the first groove, the second groove, and the central groove of the second track transition element are positioned adjacent the gap end of the second track transition element, and wherein the gap end of the second track transition element is configured to be positioned adjacent the transition gap, such that it faces the gap end of the first track transition element.

10. The transition system according to claim 9, wherein the central groove of the first track transition element is configured to align with a first antenna slot of the first track segment such that the central groove of the first track transition element is configured to receive an antenna of the trolley once the antenna exits the first antenna slot of the first track segment, as the first track transition element receives the trolley from the first track segment, and wherein the central groove of the second track transition element is configured to align with a second antenna slot of the second track segment such that the central groove of the second track transition element is configured to align the antenna of the trolley to be received by the second antenna slot of the second track segment, as the second track transition element guides the trolley to the second track segment.

11. The transition system according to claim 1, wherein the first trolley slide plate and the second trolley slide plate are configured to create a space between one or more wheels of the trolley and the first track transition element when the first trolley slide plate and the second trolley slide plate are engaged with the first track transition element, such that the first trolley slide plate and the second trolley slide plate are configured to substantially prevent the trolley from contacting the first track transition element as the trolley is moved across the first track transition element from a bridge end of the first track transition element to the gap end of the first track transition element.

12. The transition system according to claim 1, wherein the first trolley slide plate and the second trolley slide plate are configured to be spaced apart from the first track segment when the trolley is on the first track segment.

13. The transition system according to claim 1, wherein the transition system is configured to accommodate misalignment or offset between the first track segment and the second track segment without interrupting travel of the trolley from the first track segment to the second track segment via the first track transition element and the second track transition element.

14. The transition system according to claim 1, further comprising the trolley, wherein the trolley is outfitted with the first trolley slide plate and the second trolley slide plate.

15. A system, comprising:

a waveguide assembly, comprising:

a first track segment comprising a first hollow channel for conducting a wireless signal, and further comprising a first antenna slot through which an antenna of a trolley extends when the trolley is engaged with the first track segment;

a second track segment comprising a second hollow channel for conducting the wireless signal, and further comprising a second antenna slot through which the antenna of the trolley extends when the trolley is engaged with the second track segment, wherein a distal end of the first track segment is spaced apart from a proximal end of the second track segment by a track gap; and the trolley, wherein the trolley is selectively movable along the first track segment, and along the second track segment to provide wireless communication for a workspace from the wireless signal; and a transition system configured to guide the trolley across the track gap while maintaining wireless communication for the workspace, the transition system comprising:

a first track transition element engaged with the first track segment of the waveguide assembly;

a second track transition element engaged with the second track segment of the waveguide assembly;

a first trolley slide plate coupled to a first surface of the trolley;

a second trolley slide plate coupled to a second surface of the trolley, wherein the first track transition element is configured to receive the first trolley slide plate and the second trolley slide plate as the trolley is moved from the first track segment of the waveguide assembly onto and across the first track transition element, wherein the first track transition element guides the first trolley slide plate and the second trolley slide plate as the trolley is moved towards and across the track gap to the second track transition element, wherein the second track transition element is configured to receive the first trolley slide plate and the second trolley slide plate as the trolley is moved from the first track transition element to the second track transition element, and wherein the second track transition element aligns the antenna with the second antenna slot of the second track segment of the waveguide assembly to transfer the trolley to the second track segment of the waveguide assembly.

16. The system according to claim 15, wherein the first track transition element is positioned with respect to the second track transition element such that a transition gap extends between a gap end of the first track transition element and a gap end of the second track transition element, wherein the first trolley slide plate and the second trolley slide plate span the transition gap between the first track transition element and the second track transition element as the trolley is moved from the first track transition element to the second track transition element, and wherein the transition system is configured to accommodate misalignment or offset between the first track segment and the second track segment without interrupting travel of the trolley from the first track segment to the second track segment, via the first track transition element and the second track transition element.

17. The system according to claim 15, wherein the first trolley slide plate and the second trolley slide plate create a space between one or more wheels of the trolley and the first track transition element when the trolley moves across the first track transition element, such that the first trolley slide plate and the second trolley slide plate substantially prevent the trolley from contacting the first track transition element as the trolley is moved across the first track transition element, wherein the first trolley slide plate and the second trolley slide plate create a space between the one or more wheels of the trolley and the second track transition element when the trolley is engaged with the second track transition element, such that the first trolley slide plate and the second trolley slide plate substantially prevent the trolley from contacting the second track transition element as the trolley is moved across the second track transition element, wherein the one or more wheels of the trolley contact the first track segment when the trolley is engaged with the first track segment, and wherein the one or more wheels of the trolley contact the second track segment when the trolley is engaged with the second track segment.

18. The system according to claim 15, wherein a central groove of the first track transition element is aligned with the first antenna slot of the first track segment such that the central groove of the first track transition element is configured to receive the antenna of the trolley once the antenna exits the first antenna slot of the first track segment as the trolley is selectively moved to the first track transition element from the first track segment, and wherein a central groove of the second track transition element is aligned with the second antenna slot of the second track segment such that the central groove of the second track transition element is configured to align the trolley with respect to the second track segment such that the antenna of the trolley is received by the second antenna slot of the second track segment as the trolley is selectively moved from the second track transition element to the second track segment.

19. A method of transferring a trolley of a waveguide assembly from a first track segment to a second track segment, the method comprising:

securing a first trolley slide plate to a first surface of the trolley;

securing a second trolley slide plate to a second surface of the trolley;

engaging a first track transition element with a distal end of the first track segment;

engaging a second track transition element with a proximal end of the second track segment;

engaging the trolley with the first track segment such that one or more wheels of the trolley roll along the first track segment as the trolley is selectively moved along the first track segment, wherein the first trolley slide plate and the second trolley slide plate are spaced apart from the first track segment when the trolley is engaged with the first track segment;

lifting the one or more wheels of the trolley off the first track segment by selectively moving the trolley towards the first track transition element until the first trolley slide plate and the second trolley slide plate are received by the first track transition element;

selectively moving the trolley along the first track transition element and towards the second track transition element until the trolley passes over a transition gap between the first track transition element and the second track transition element, and until the first trolley slide plate and the second trolley slide plate are received by the second track transition element;

aligning an antenna of the trolley with an antenna slot of the second track segment such that the antenna is received by the antenna slot when the trolley is selectively moved onto the second track segment from the second track transition element; and engaging the one or more wheels of the trolley with the second track segment.

20. The method according to claim 19, wherein the first track transition element extends longitudinally from a bridge end to a gap end of the first track transition element, and wherein each of a first groove, a second groove, and a central groove of the first track transition element extends longitudinally across the first track transition element from the bridge end to the gap end of the first track transition element, wherein the engaging the first track transition element with the distal end of the first track segment comprises positioning the first track transition element such that a respective flared portion of the first groove, the second groove, and the central groove of the first track transition element are positioned adjacent the gap end of the first track transition element, wherein the second track transition element extends longitudinally from a bridge end to a gap end of the second track transition element, and wherein each of a first groove, a second groove, and a central groove of the second track transition element extends longitudinally across the second track transition element from the bridge end to the gap end of the second track transition element, and wherein the engaging the second track transition element with the proximal end of the second track segment comprises positioning the second track transition element such that a respective flared portion of the first groove, the second groove, and the central groove of the second track transition element are positioned adjacent the gap end of the first track transition element.

* * * * *